(12) United States Patent
Foskey et al.

(10) Patent No.: US 11,242,158 B2
(45) Date of Patent: Feb. 8, 2022

(54) MOTIVE FAIRING ASSEMBLY FOR USE IN ROTORCRAFTS

(71) Applicant: Bell Helicopter Textron Inc., Fort Worth, TX (US)

(72) Inventors: Christopher Edward Foskey, Keller, TX (US); Chyau-Song Tzeng, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 314 days.

(21) Appl. No.: 16/247,745

(22) Filed: Jan. 15, 2019

(65) Prior Publication Data

US 2020/0223552 A1 Jul. 16, 2020

(51) Int. Cl.
*B64D 29/06* (2006.01)
*B64C 11/28* (2006.01)
*B64C 29/00* (2006.01)

(52) U.S. Cl.
CPC .............. *B64D 29/06* (2013.01); *B64C 11/28* (2013.01); *B64C 29/0033* (2013.01)

(58) Field of Classification Search
CPC ..... B64D 29/06; B64C 11/28; B64C 29/0033; B64C 1/063; B64C 1/0683; B64C 1/26; B64C 1/30; B64C 3/56; B64C 27/50
See application file for complete search history.

(56) References Cited

U.S. PATENT DOCUMENTS

| | | | | |
|---|---|---|---|---|
| 3,310,120 | A * | 3/1967 | Vacca | B64C 27/50 |
| | | | | 416/103 |
| 10,370,087 | B2 * | 8/2019 | Lopez Ferrer | B63H 1/14 |
| 10,618,632 | B2 * | 4/2020 | Foskey | B64C 27/50 |
| 2012/0012696 | A1 * | 1/2012 | Sakurai | B64C 9/16 |
| | | | | 244/99.3 |
| 2015/0266571 | A1 * | 9/2015 | Bevirt | B64C 29/0033 |
| | | | | 244/7 C |
| 2017/0197711 | A1 * | 7/2017 | King | B64C 29/0025 |
| 2017/0203831 | A1 * | 7/2017 | Lopez Ferrer | B64C 39/024 |
| 2018/0229830 | A1 * | 8/2018 | Foskey | B64C 11/28 |
| 2018/0334240 | A1 * | 11/2018 | Paulson | B64C 7/00 |
| 2018/0362154 | A1 * | 12/2018 | Louis | B64C 27/30 |
| 2020/0055586 | A1 * | 2/2020 | Foskey | B64C 11/14 |
| 2020/0377205 | A1 * | 12/2020 | Baskin | B64C 27/04 |
| 2021/0078695 | A1 * | 3/2021 | Foskey | B64C 11/28 |
| 2021/0094683 | A1 * | 4/2021 | Foskey | B64C 29/0033 |

* cited by examiner

*Primary Examiner* — Joshua J Michener
*Assistant Examiner* — Cindi M Curry
(74) *Attorney, Agent, or Firm* — Lightfoot & Alford PLLC

(57) ABSTRACT

A rotor assembly for use in an aircraft comprising has a rotor hub, a spinner structure comprising a spinner opening, and a rotor blade received through the spinner opening. The rotor blade has a rotor root located proximate to the rotor hub. The rotor assembly also has a motive fairing face that at least partially rests along the rotor hub.

20 Claims, 23 Drawing Sheets

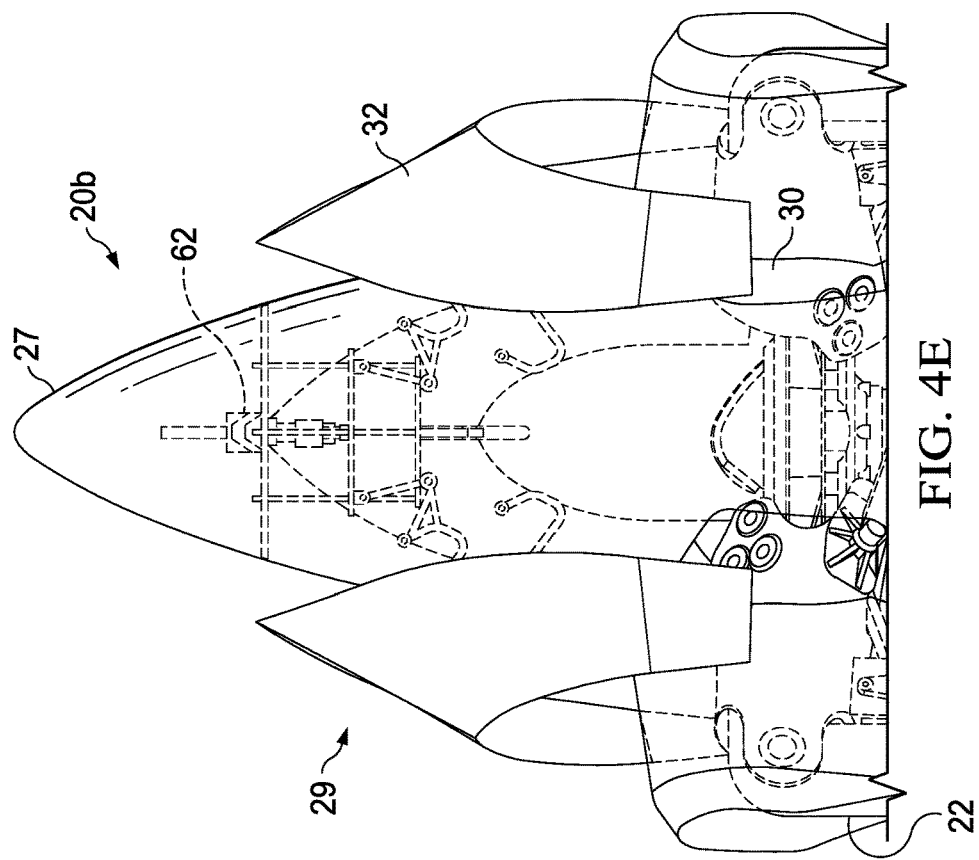
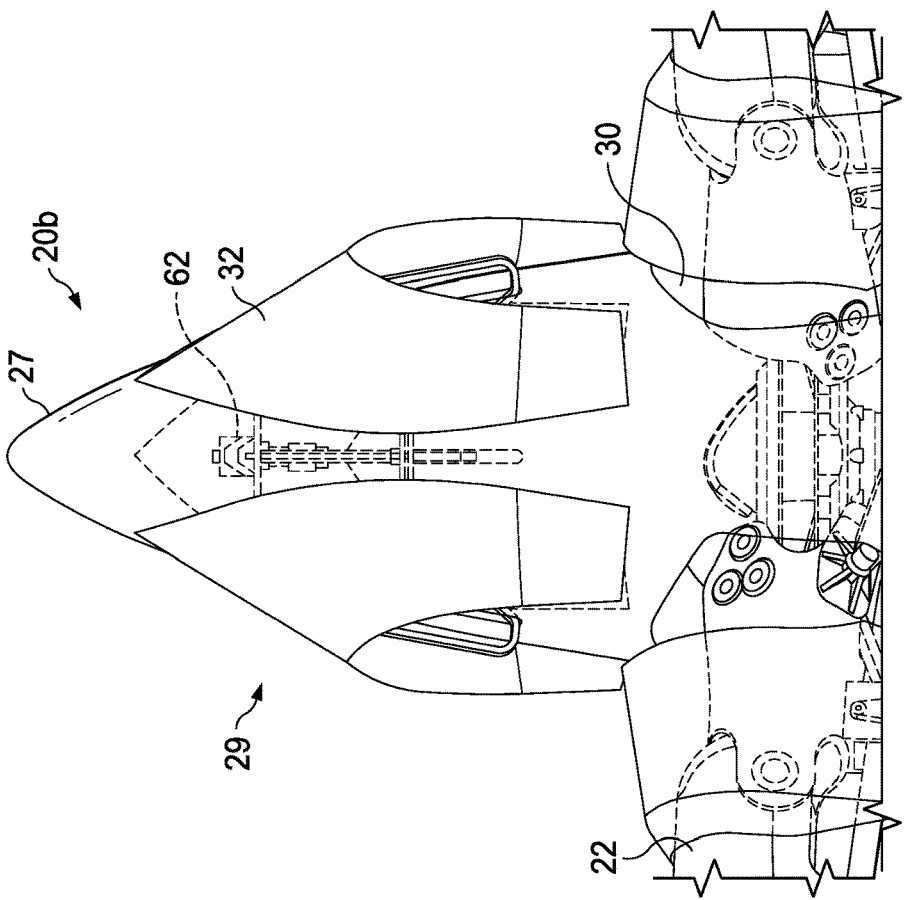
FIG. 4E
FIG. 4D

MOTIVE FAIRING ASSEMBLY FOR USE IN ROTORCRAFTS

CROSS REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE DISCLOSURE

The present disclosure relates, in general, to a rotor assembly operable for use on a rotorcraft and, in particular, to a motive aerodynamic fairing assembly configured to move relative to the rotor assembly.

BACKGROUND

One example of an aircraft is a tiltrotor. A tiltrotor aircraft may operate in a helicopter flight mode by tilting its rotors upright and in a proprotor forward flight mode by tilting its rotors forward. Tiltrotor aircraft may generate greater forward speed in proprotor forward flight mode than in helicopter mode because, in proprotor forward flight mode, the rotor blades are oriented to provide propulsion force while the wing provides lift.

In proprotor forward flight mode, aeroelastic instability generated by the rotor blades reduces the maximum forward airspeed of tiltrotor aircraft. A variation of a tiltrotor aircraft, called a stop-fold aircraft, overcomes this problem by transitioning into an airplane forward flight mode. In airplane forward flight mode, the stop-fold aircraft folds the rotor blades parallel to the rotor pylons and uses a secondary power source, such as a turbofan engine, to generate greater forward speed than in proprotor forward flight. While forward speed is increased in airplane forward flight mode, parasitic drag generated in high speed flight by exposed spinner openings reduces the maximum forward airspeed of stop-fold aircraft. Accordingly, a need has arisen for a motive fairing assembly that fairs the exposed spinner openings in high-speed flight.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4F are oblique views of rotor assemblies with fairing assemblies in various positions;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
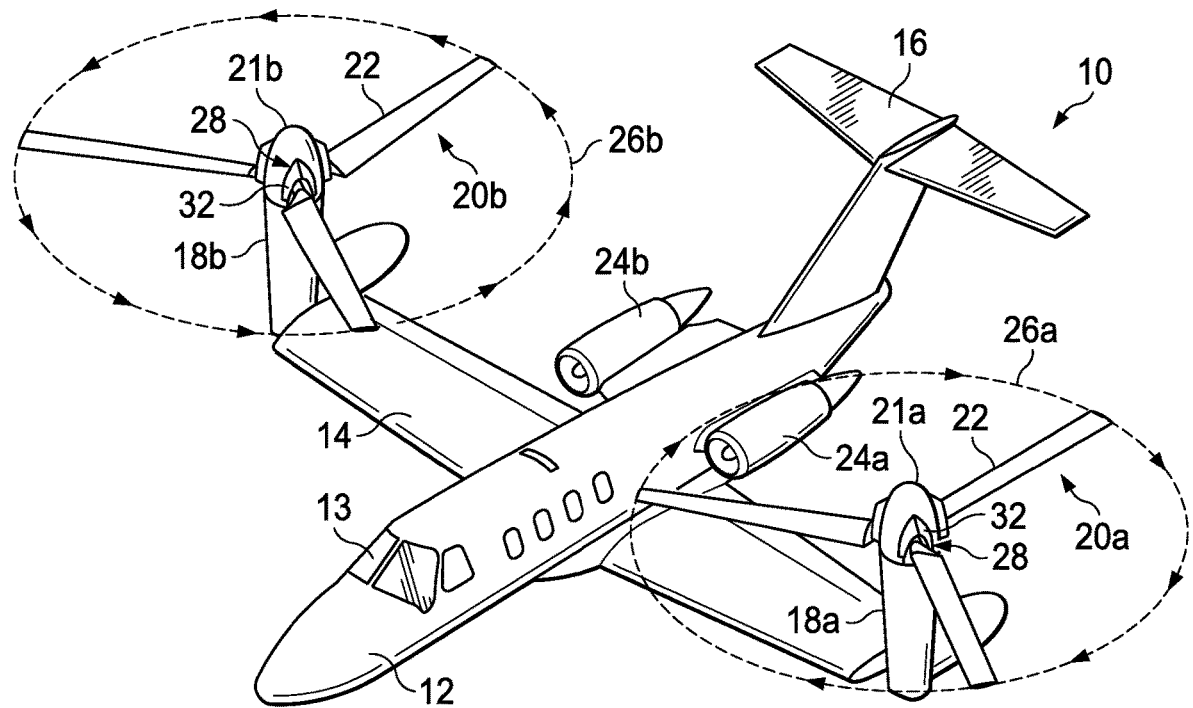
FIGS. 1A-1D are schematic illustrations of a conceptual stop-fold aircraft in various flight modes in accordance with embodiments of the present disclosure.
Figure 1B:
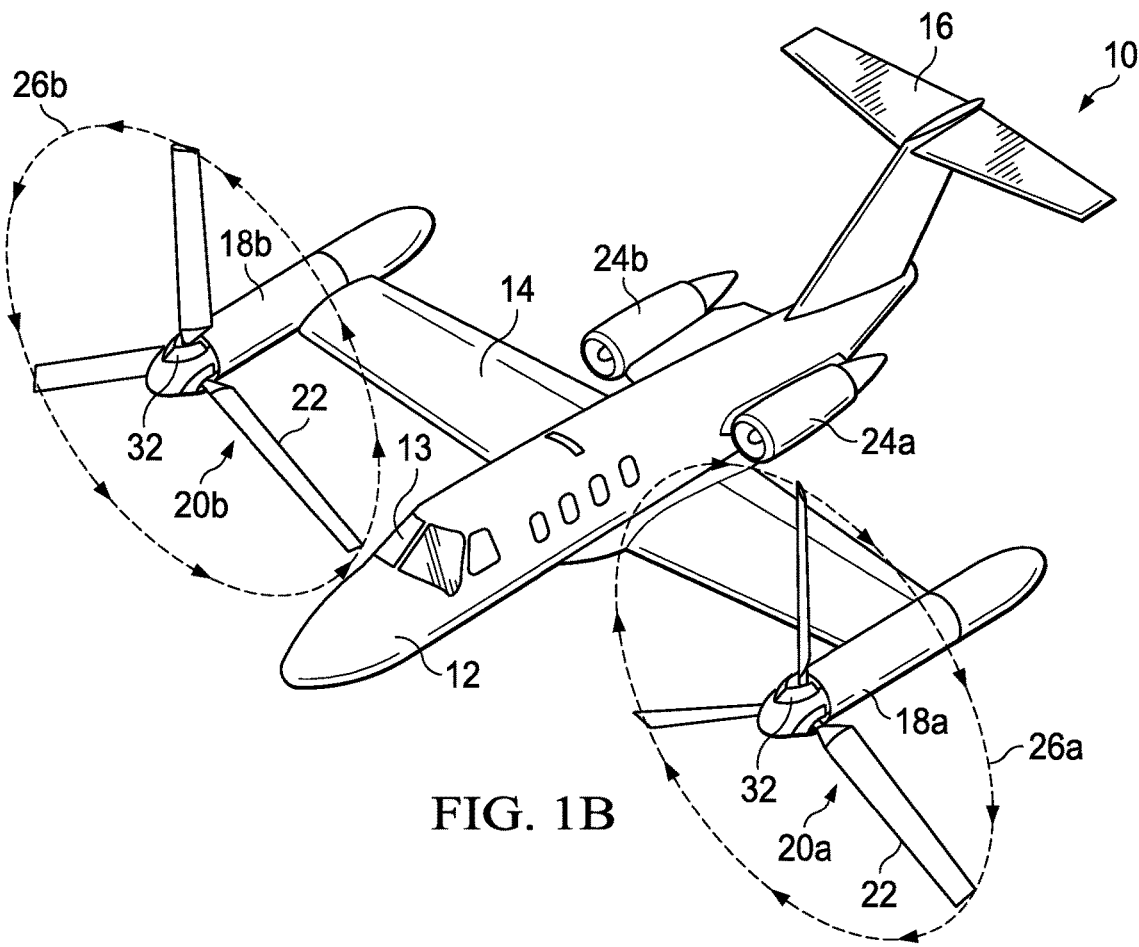
Figure 1C:
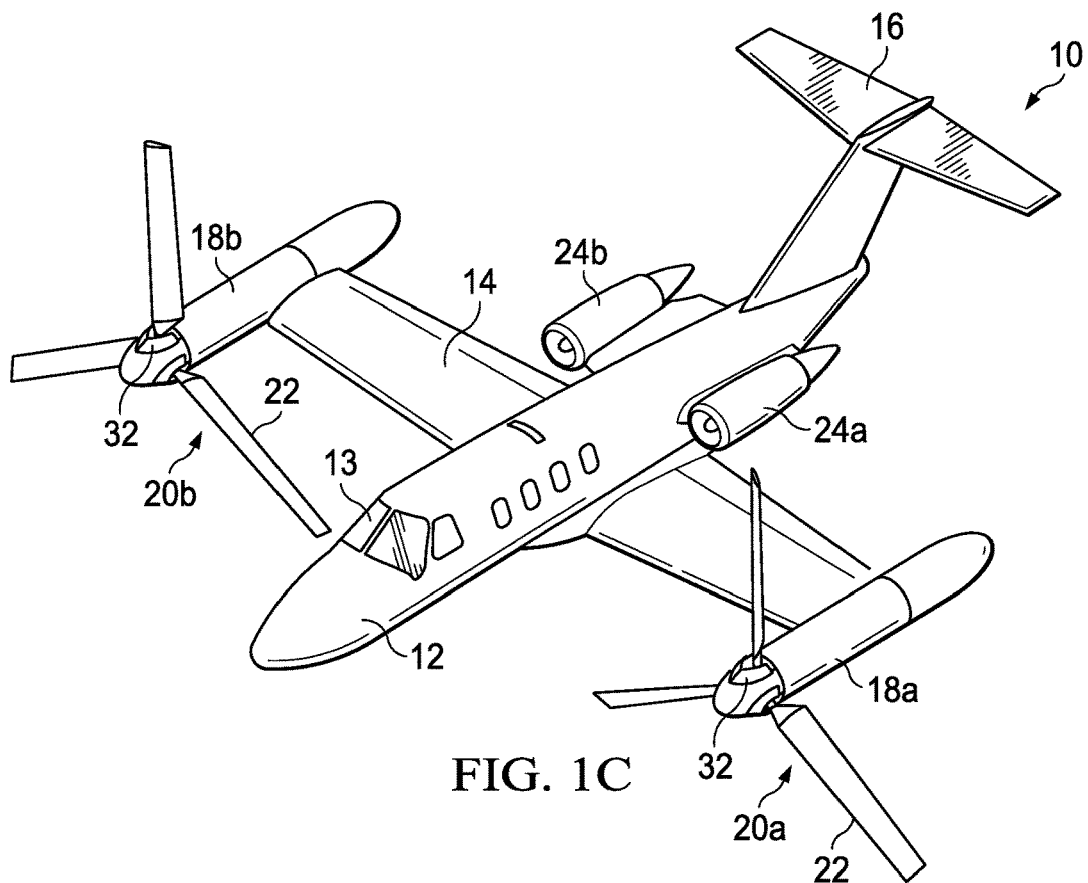
Figure 1D:
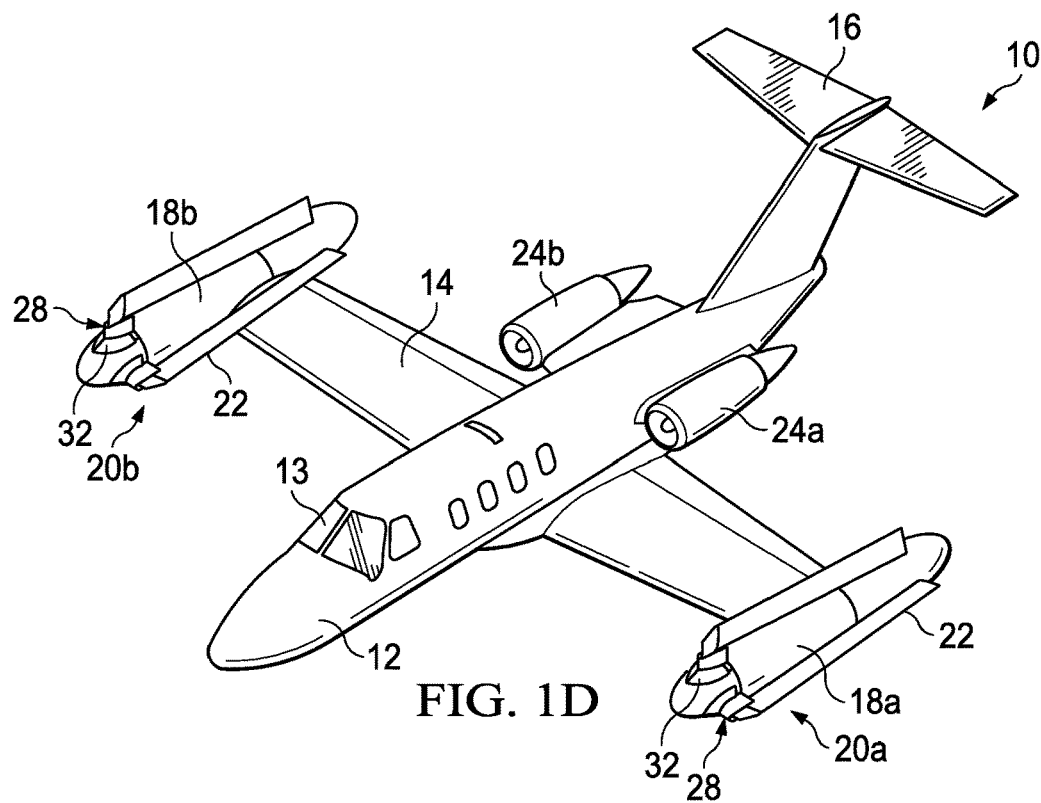

Referring to FIGS. 1A-1D in the drawings, a stop-fold aircraft 10 is schematically illustrated. Aircraft 10 includes a fuselage 12, a cockpit 13, a wing 14, and a tail assembly 16. Aircraft 10 can also include engines 24a, 24b. Located proximate the outboard ends of wing 14 are pylon assemblies 18a, 18b that are rotatable relative to wing 14 between a generally vertical orientation, as best seen in FIG. 1A, and a generally horizontal orientation, as best seen in FIGS. 1B-1D. Pylon assemblies 18a, 18b include rotor assemblies 20a, 20b, respectively. Each rotor assembly 20a, 20b includes a rotor hub 21a and 21b, a plurality of rotor blades 22 and a plurality of fairing faces 32. The fairing faces 32 are generally shovel-shaped and aerodynamically rounded to fair incoming airflow. The base of the fairing faces 32, when not in motion, generally rest along the surface of the rotor hub 21a and 21b. The forward section of the fairing faces 32 has a base with rounded edges that taper into a central forwardmost point, which may be either pointed or rounded. By contrast, the lower section's base edges generally form a u-shape designed to partially encompass the root section of the rotor blades 22. From their base, the fairing faces 32 curve outward and extend to at least partially level with the root section of the rotor blades 22. It should be noted that the forward section has a lower profile situated closer to the surface of the rotor hub 21a and 21b than the lower section, which has a higher profile that protrudes further outward.

FIG. 1A illustrates aircraft 10 in helicopter flight mode, in which rotor assemblies 20a, 20b rotate in a substantially horizontal plane to provide a lifting thrust, such that aircraft 10 flies much like a conventional helicopter. In helicopter flight mode, rotor blades 22 selectively flap and feather to control the speed and movement of aircraft 10. Furthermore, in helicopter flight mode, the fairing faces 32 are in a stowed or disengaged position above the rotor blades 22, thereby providing clearance for the rotor blade motions.

FIG. 1B illustrates aircraft 10 in proprotor forward flight mode, in which rotor assemblies 20a, 20b are rotating in a substantially vertical plane to provide a forward thrust enabling wing 14 to provide a lifting force responsive to forward airspeed, such that aircraft 10 flies much like a conventional propeller driven aircraft. In proprotor forward flight mode, the aircraft 10 is primarily controlled by control surfaces along the wing 14 and tail assembly 16; but the rotor blades 22 can also selectively flap and feather to control the speed and movement of aircraft 10. Furthermore, in proprotor forward flight mode, the fairing faces 32 remain in a stowed or disengaged position above the rotor blades 22.

FIG. 1C illustrates aircraft 10 in transition mode, in which aircraft 10 transitions between proprotor forward flight mode and airplane forward flight mode. In transition mode, rotor blades 22 of rotor assemblies 20a, 20b have been feathered, or oriented to be streamlined in the direction of flight, such that rotor blades 22 act as brakes to aerodynamically stop the rotation of rotor assemblies 20a, 20b. In this configuration, engines 24a, 24b are operable in turbofan mode wherein hot combustion gases in each engine 24a, 24b cause rotation of a power turbine coupled to an output shaft that is used to power a turbofan that forces bypass air through a fan duct to create forward thrust enabling wing 14 to provide a lifting force responsive to forward airspeed, such that aircraft 10 flies much like a conventional jet aircraft. In transition mode, the fairing faces 32 remain in a stowed or disengaged position above the rotor blades 22.

FIG. 1D illustrates aircraft 10 in airplane forward flight mode, in which rotor blades 22 of rotor assemblies 20a, 20b have been folded to be oriented and positionally locked substantially parallel to respective pylon assemblies 18a, 18b to minimize the drag force generated by rotor blades 22. In this configuration, engines 24a, 24b are operable in the turbofan mode and aircraft 10 is in the airplane forward flight mode. In airplane forward flight mode, the fairing faces 32 have been actuated into an engaged position proximate to and generally fitted around the rotor blades' 22 roots.

Figure 2:
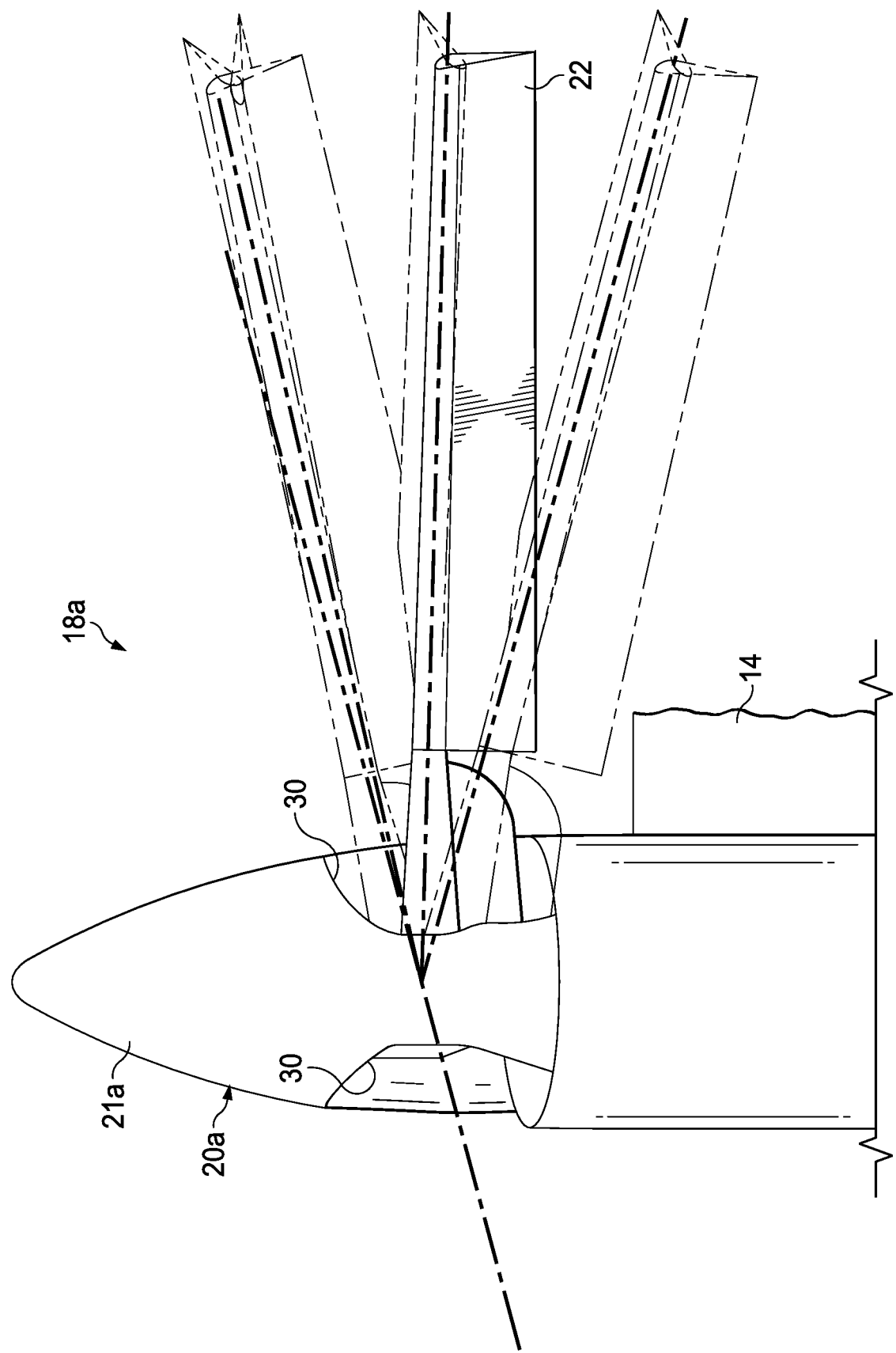
FIG. 2 is an illustration of a rotor assembly with an exposed spinner opening and rotor blade in various flapping and feathering positions.

Referring to FIG. 2, a simplified illustration of the pylon assembly 18a is shown. The rotor hub 21a is situated at the top of the pylon assembly 18a and is generally conically or spherically shaped with a rounded topmost point. The base of the rotor hub 21a transitions seamlessly into the lower structure pylon assembly 18a, which is generally cylindrically shaped and extends downward toward the wing 14. The rotor assemblies 20a, 20b comprise spinner structures 27 that comprise a plurality of spinner openings 30. The spinner openings 30 are therethrough used to receive the rotor blades 22. Some rotor blades 22 are not shown for clarity. The spinner openings 30 are large enough to accommodate the multiple flapping and feathering movements of the associated rotor blades 22, as seen on the right-hand side of the image. The large spinner openings 30 are required in helicopter mode and proprotor forward flight mode when the rotor blades 22 must extend through the openings 30 at various locations to flap and feather as needed. However, in airplane forward flight mode, the rotor blades 22 are folded and secured along the longitudinal length of the rotor assembly 20a and are fixed in place. Accordingly, the spinner openings 30 do not need to be exposed to incoming airflow and can be faired in airplane forward flight mode.

FIG. 3A-3D illustrate a fairing assembly 28 comprising the fairing faces 32 and a slider actuator assembly 34, wherein the fairing faces 32 are actuated into different positions relative to the spinner openings 30. The slider actuator assembly 34 is located internally within the associated rotor assemblies 20a, 20b. The pictured slider actuator assembly 34 simultaneously actuates the three fairing faces 32. However, in alternative embodiments separate actuator assemblies could be constructed to actuate individual fairing faces 32 independently of one another. The rotor blades 22 are not shown for clarity.

Figure 3B:
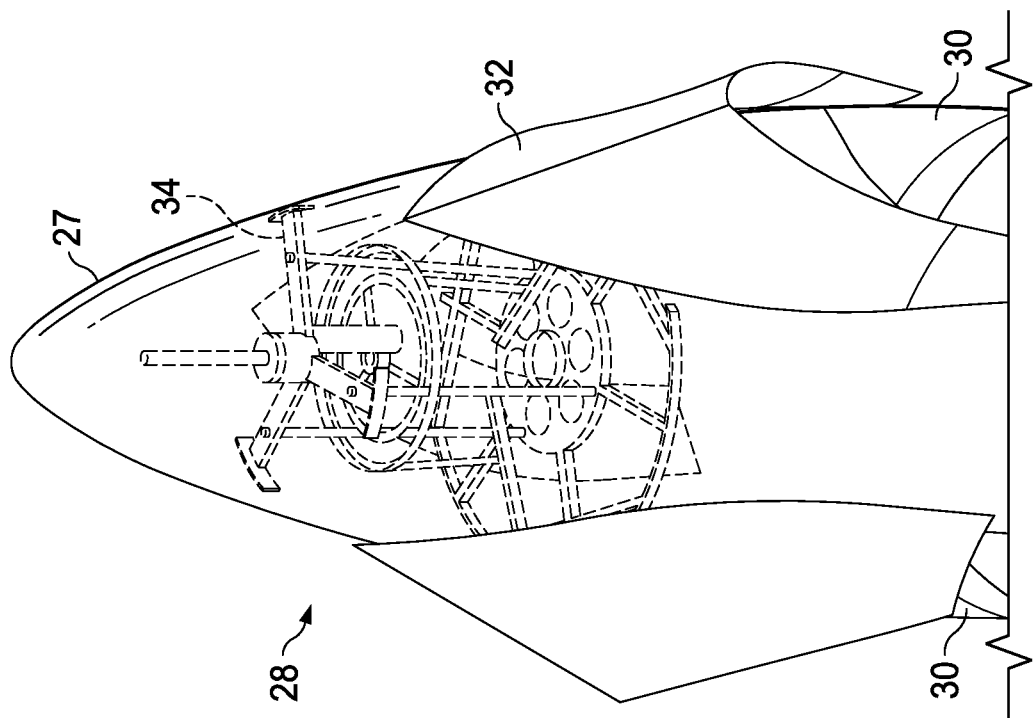
FIGS. 3A-3H are oblique views of fairing assemblies in various positions.
Figure 3A:
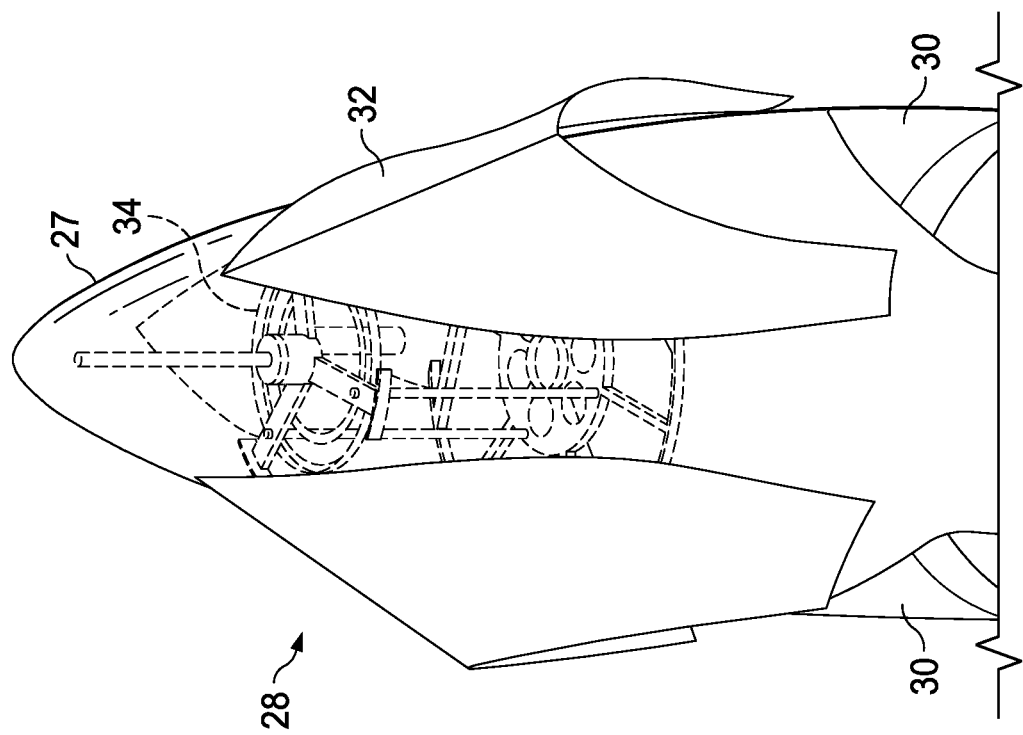

FIG. 3A shows the fairing assembly 28 in a stowed or disengaged position, wherein the fairing faces 32 are placed well-above the spinner openings 30 and out of the path of the rotor blades 22. Aircraft 10 keeps the fairing assembly 28 in a disengaged position while in helicopter mode and while in proprotor forward flight mode.

Figure 3C:
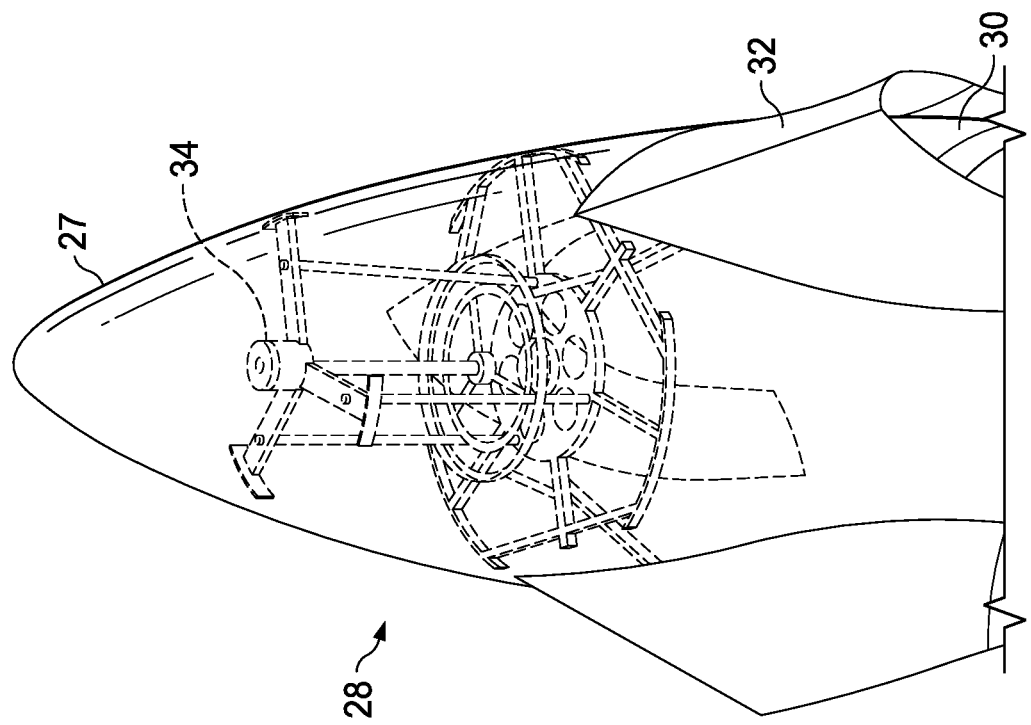

FIGS. 3B-3C show the fairing assembly 28 in intermediate positions between the disengaged position and the engaged position. Relative to the disengaged position, the fairing faces 32 are located closer to the spinner opening 30 and closer to the engaged position. The fairing assembly 28 enters transient positions from the disengaged position after aircraft 10 is in airplane forward flight mode.

Figure 3D:
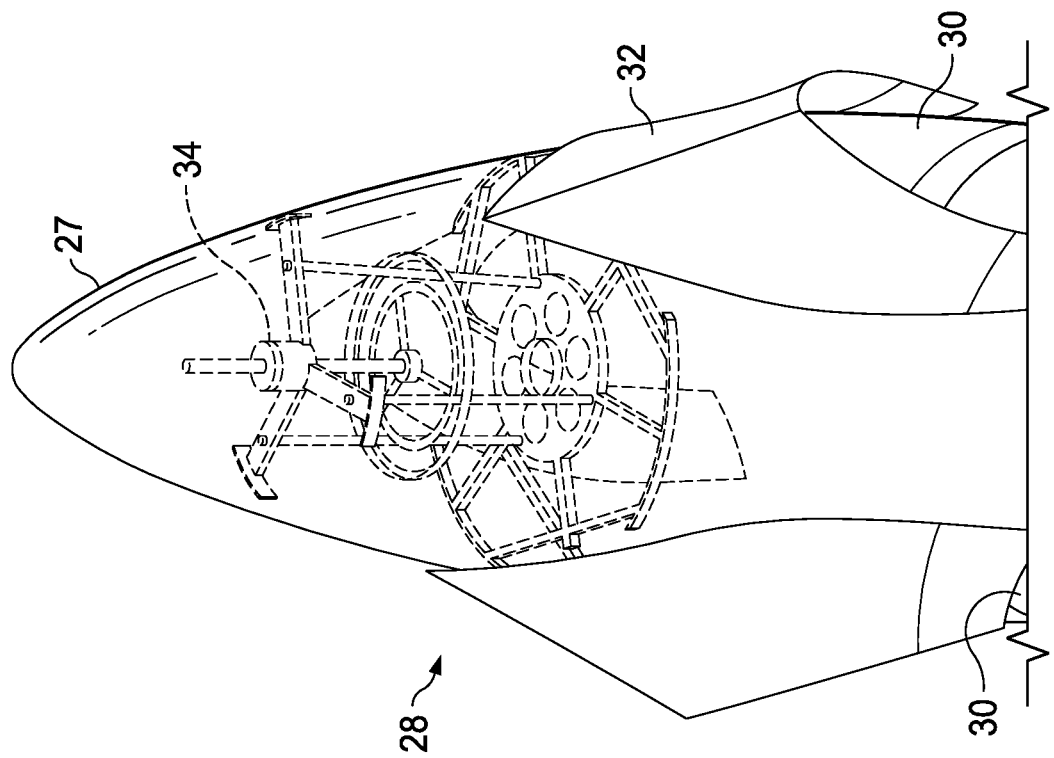
Figure 3F:
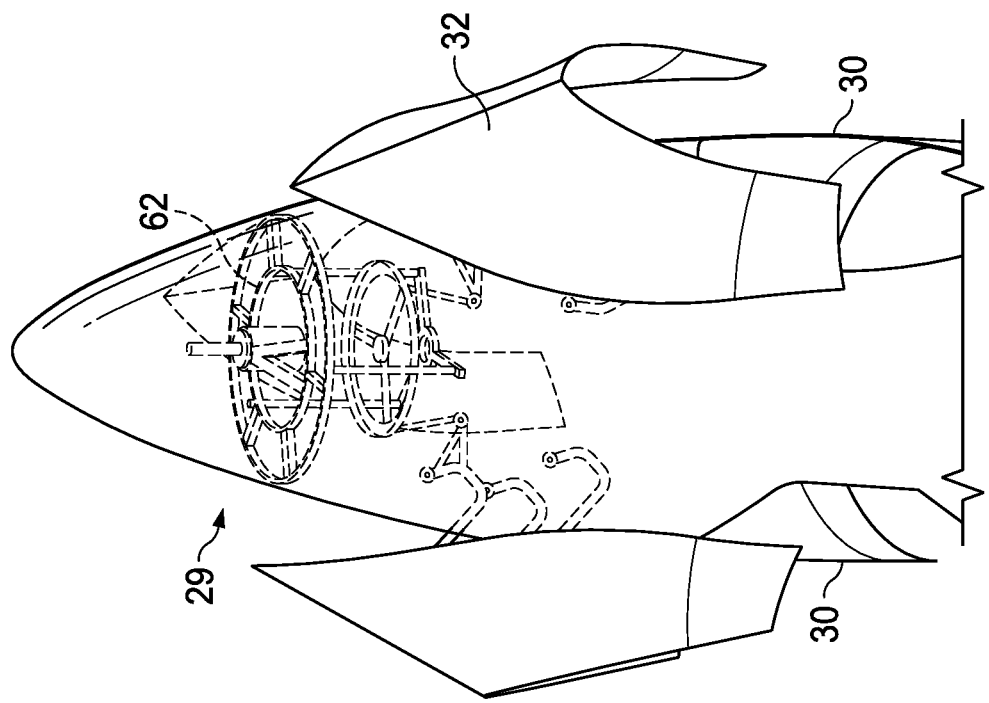
Figure 3E:
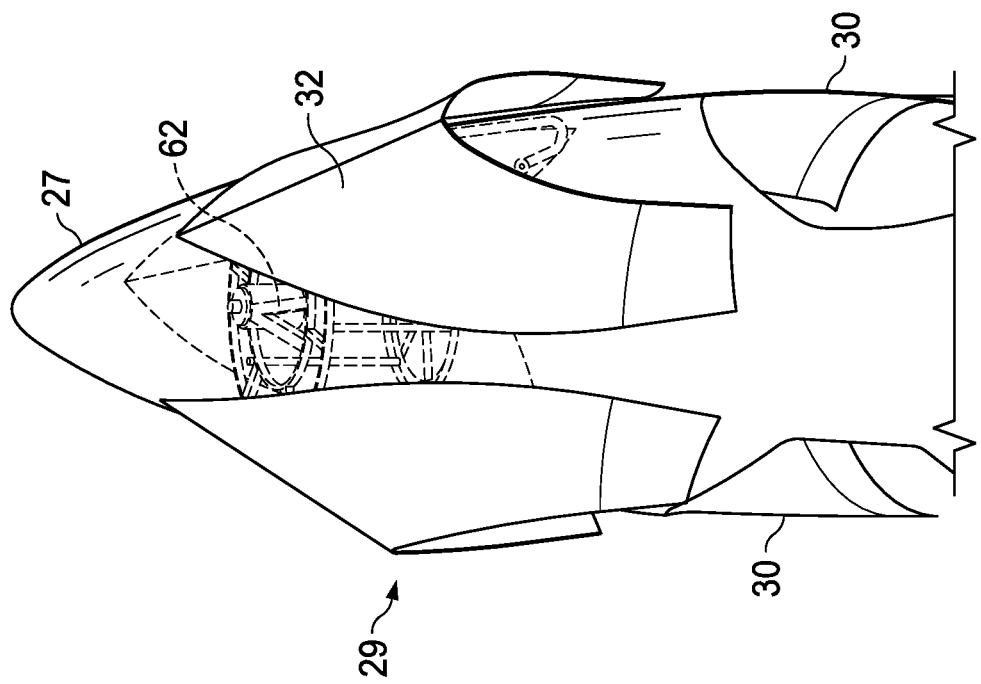
Figure 3H:
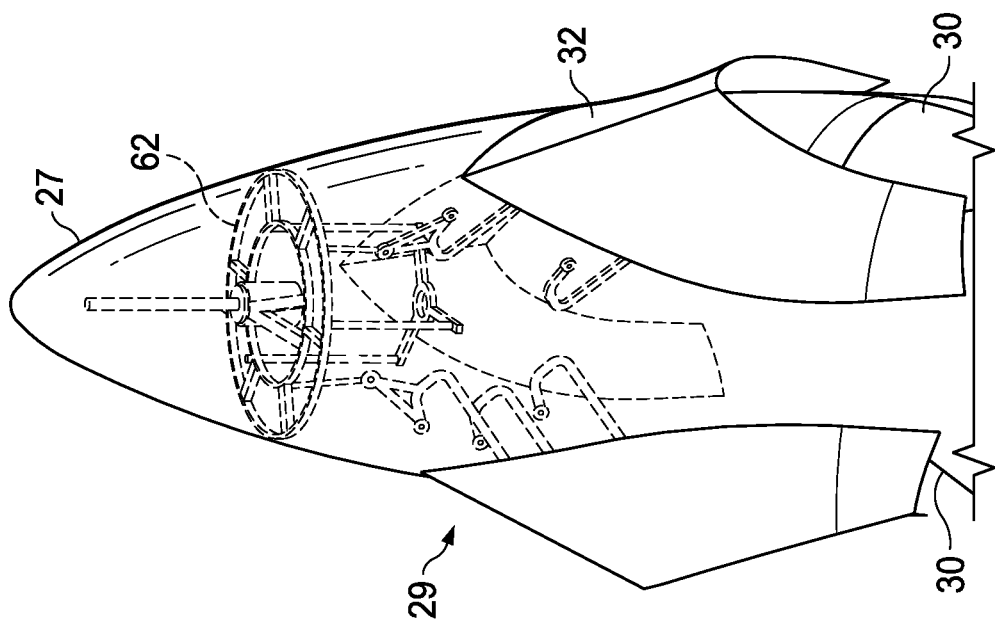
Figure 3G:
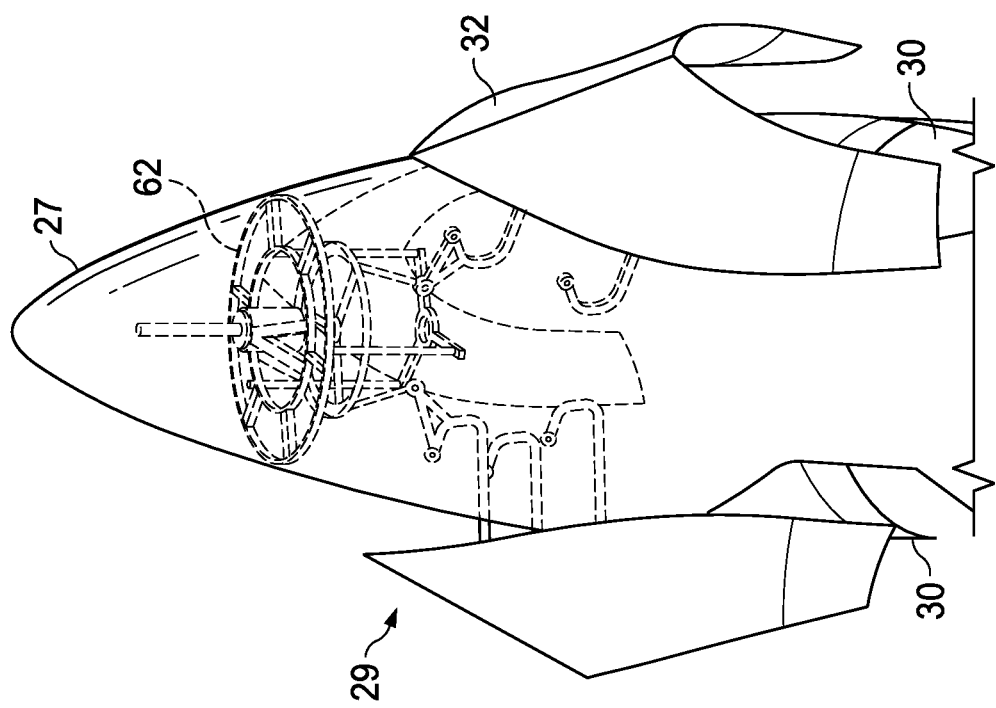

Finally, FIG. 3D shows the fairing assembly 28 in an engaged position. The fairing faces 32 at least partially aerodynamically fair the spinner openings 30 to reduce parasitic drag. While in an engaged position, the fairing faces 32 are merely in their closest proximity to the spinner openings 30 and do not overlap any portion of the spinner openings 30. Aircraft 10 keeps the fairing assembly 28 in the engaged position while in airplane forward flight mode.

FIGS. 3E-3H illustrate an alternative embodiment of a fairing assembly 29 that uses a 4-bar actuator assembly 62, wherein the fairing faces 32 are actuated into different positions relative to the spinner opening 30. The fairing assembly 29 can be incorporated into aircraft 10 in a manner substantially similar as the manner in which fairing assembly 28 is incorporated into aircraft 10. The illustrations show the 4-bar actuator assemblies 62 located internally within the associated rotor assemblies 20a, 20b. The pictured 4-bar actuator assembly 62 simultaneously actuates the three fairing faces 32. However, in alternative embodiments, separate actuator assemblies could be constructed to actuate individual fairing faces 32 independently of one another. The rotor blades 22 are not shown for clarity. FIGS. 3E, 3F and 3G, and 3H are in disengaged, intermediate, and engaged positions, respectively.

Figure 4B:
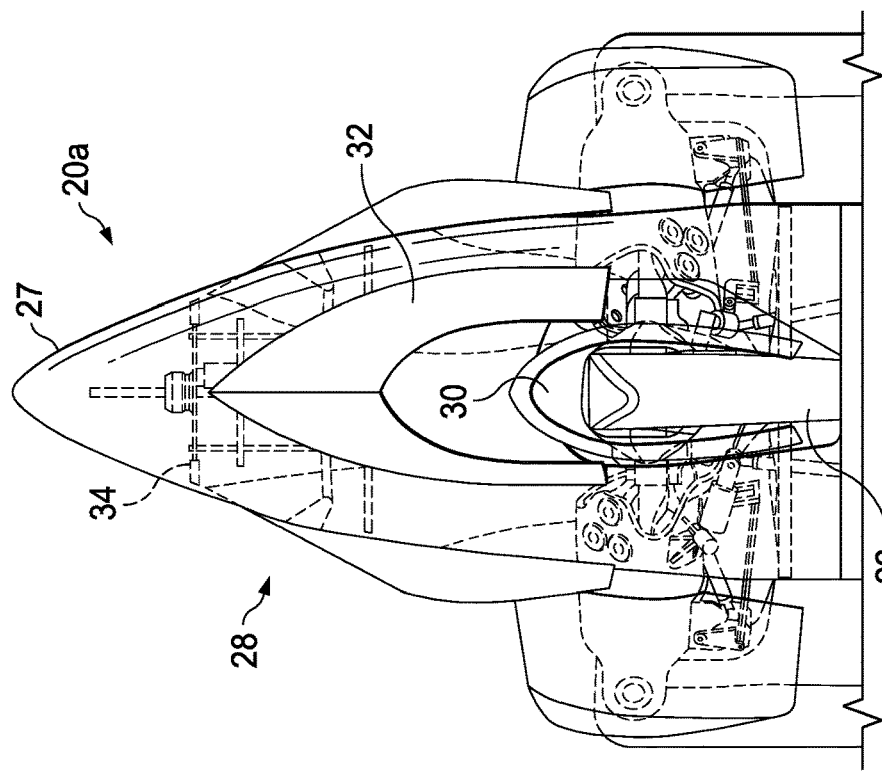
Figure 4A:
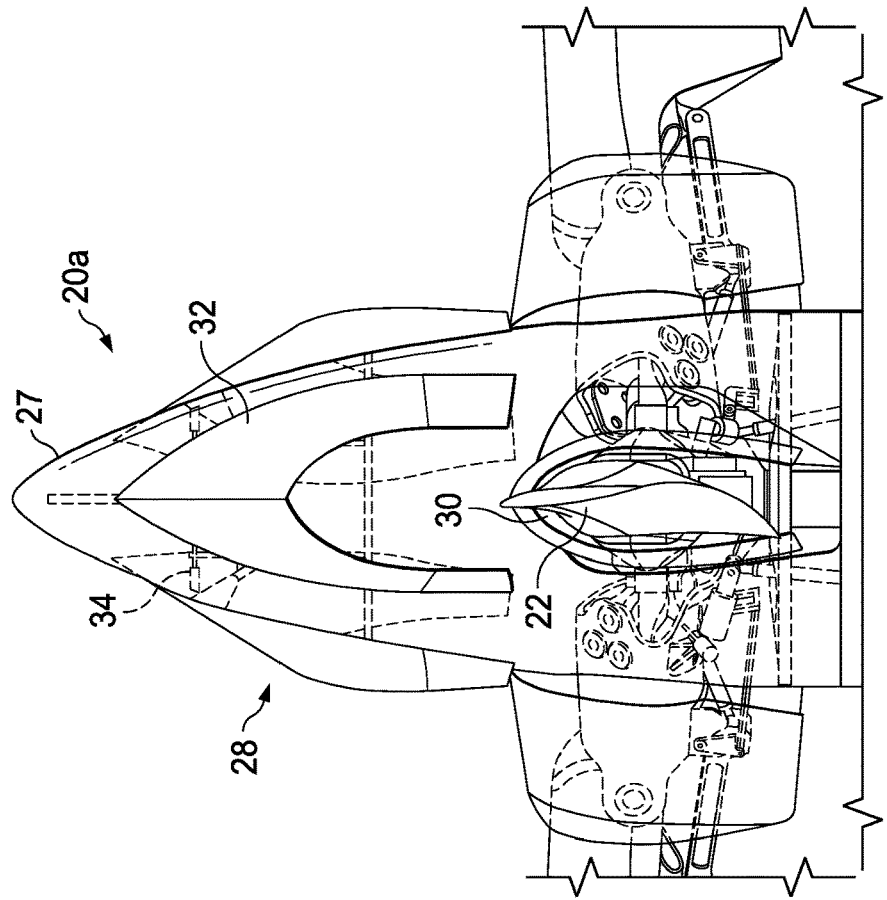
Figure 4C:
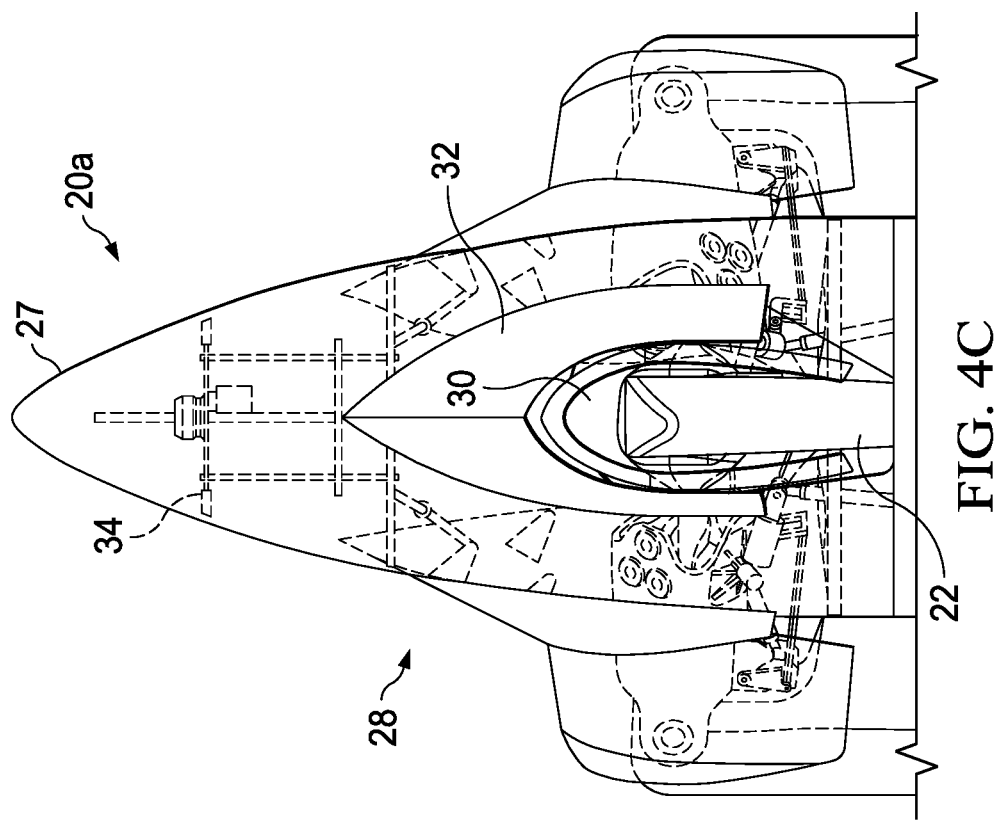

FIGS. 4A-4C show side-views of a rotor assembly 20a comprising rotor blades 22, spinner openings 30, and fairing assemblies 28. The fairing assemblies 28 comprise the actuator faces 32 and the slider actuator assembly 34. FIGS. 4A, 4B, and 4C, respectively, show the fairing assemblies 28 in a disengaged, intermediate, and engaged position.

Figure 4F:
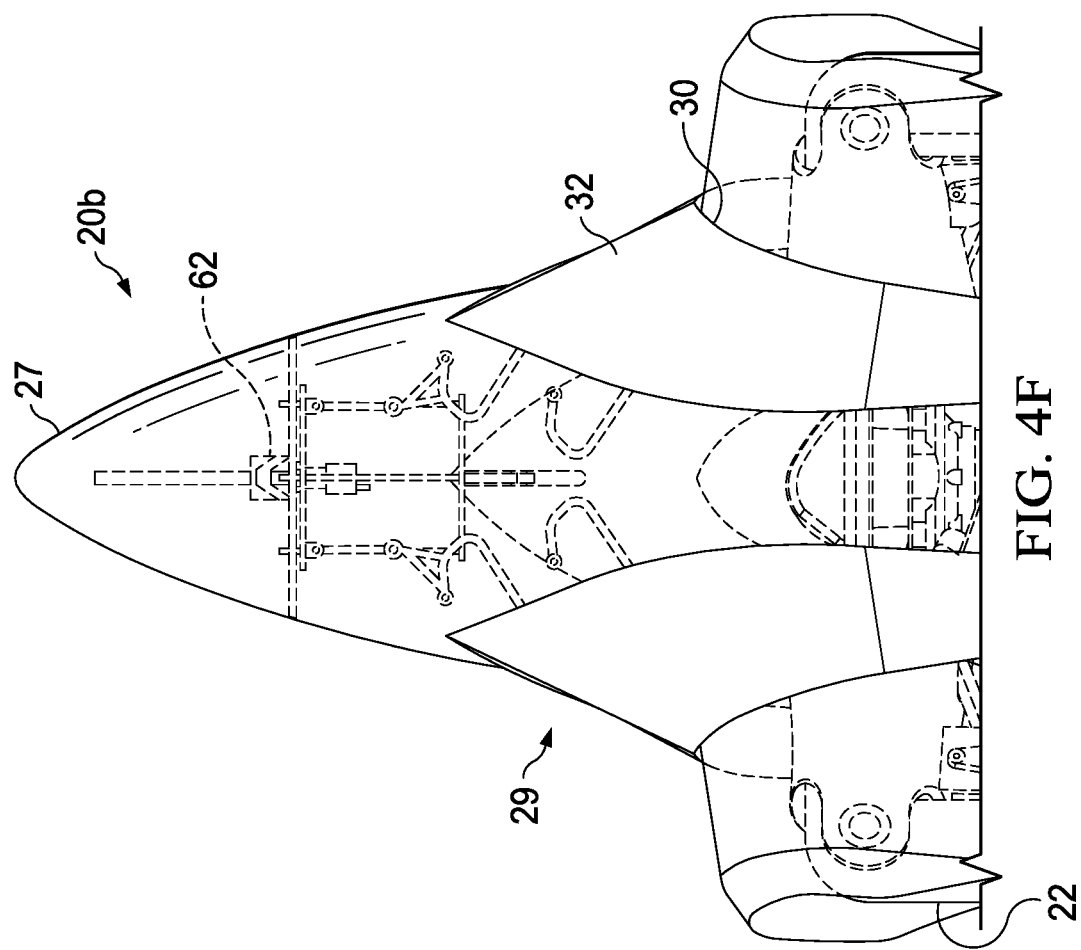

FIGS. 4D-4F show side-views of a rotor assembly 20a comprising rotor blades 22, spinner openings 30, and fairing assemblies 29. The fairing assemblies 29 comprise the actuator faces 32 and the 4-bar actuator assembly 62. FIGS. 4D, 4E, and 4F, respectively, show the fairing assemblies 29 in a stowed, intermediate, and engaged position.

Figure 5A:
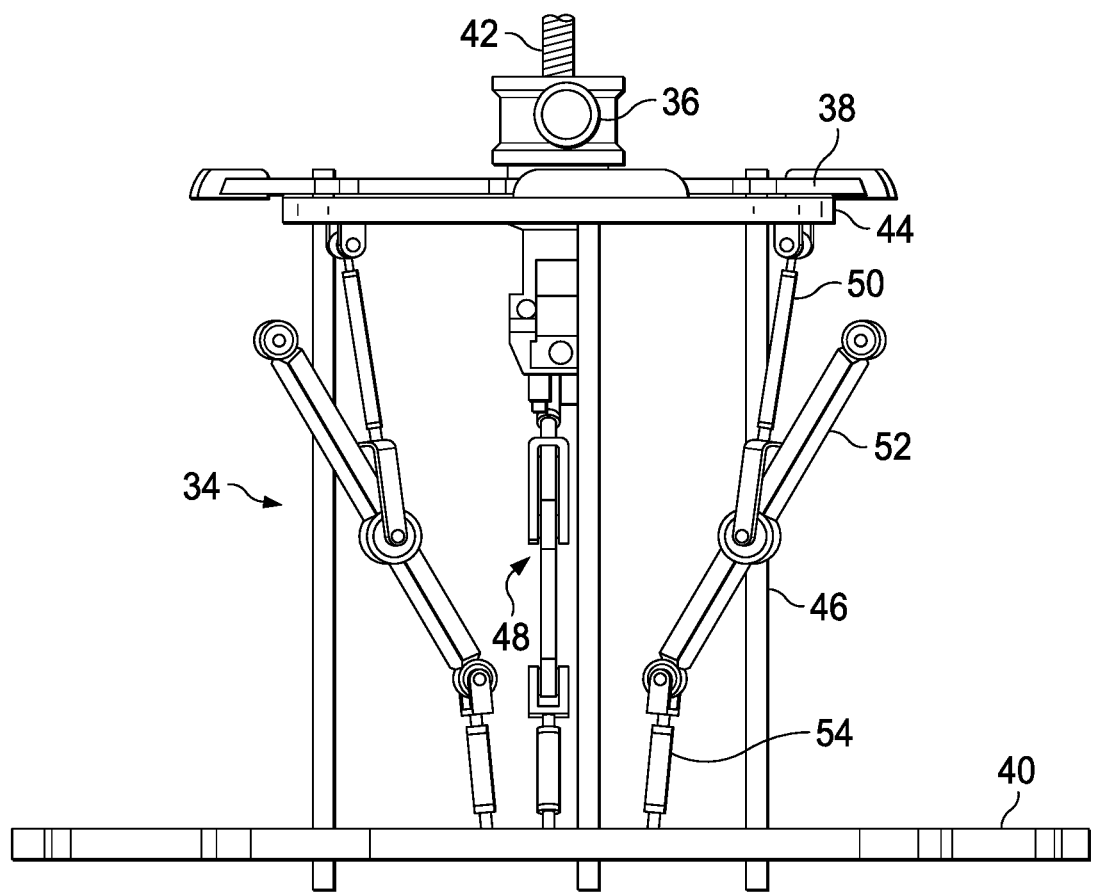
FIGS. 5A-5C are side views of a slider actuator assembly in various positions.
Figure 5B:
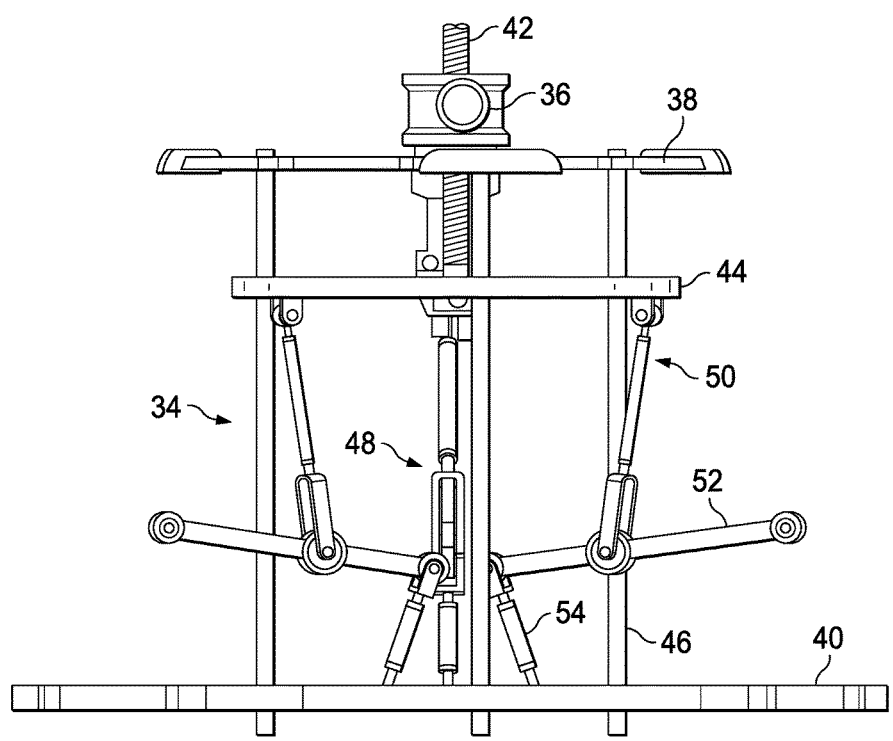
Figure 5C:
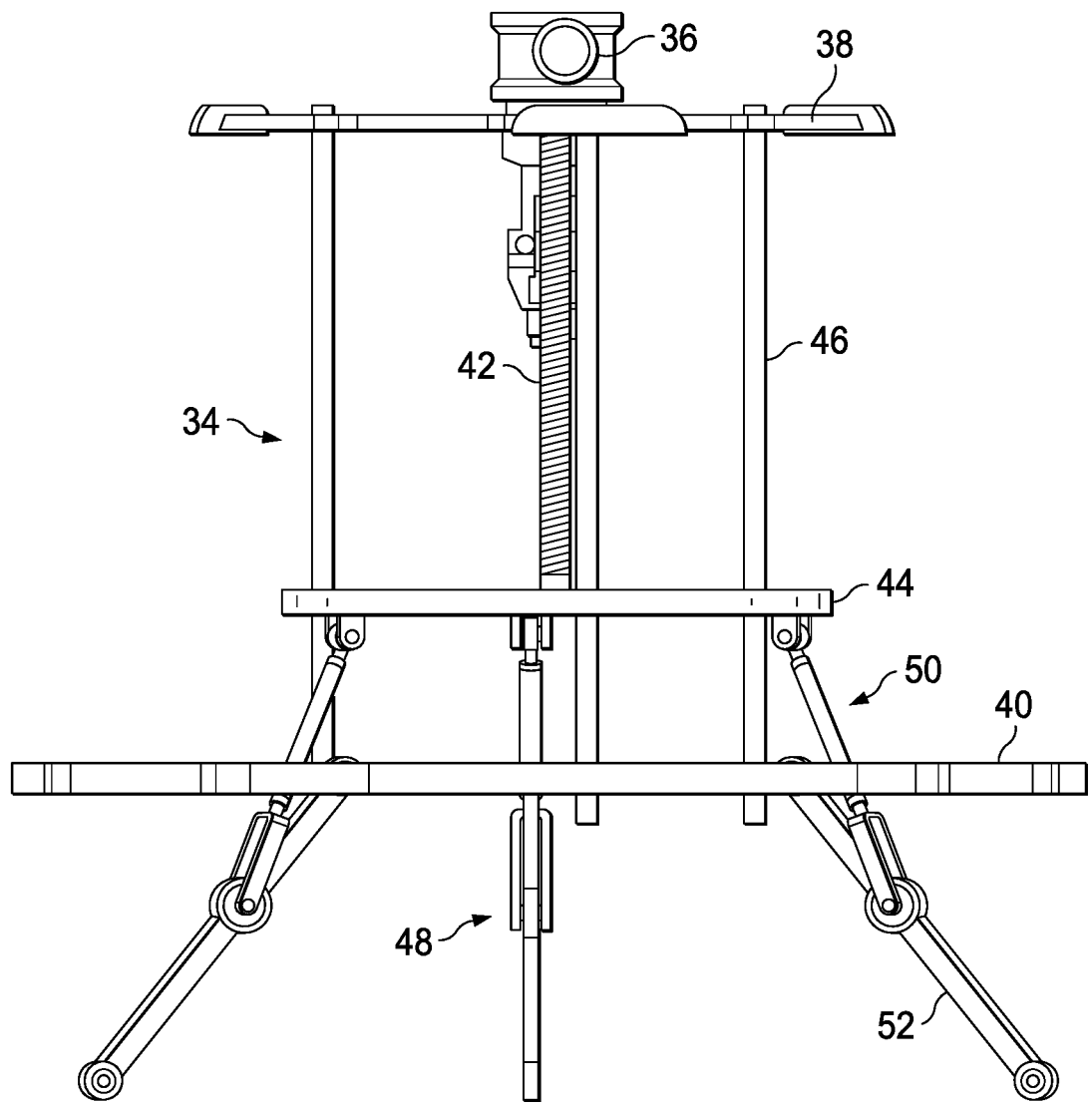

Referring to FIGS. 5A-5C, side views of the slider actuator assembly 34 are shown. The slider actuator assembly 34 can include: a first stationary ring 38 located at the top of the slider actuator assembly 34 and a second stationary ring 40 located at the bottom of the slider actuator assembly 34. The first stationary ring 38 and second stationary ring 40 couple the slider actuator assembly 34 to the rotor assembly 20a and hold the slider actuator assembly 34 in place. The slider actuator assembly 34 is powered by a power source 36, which turns a ball-screw 42. In certain embodiments, the power source 36 is a hydraulic motor; but the actuator assembly 34 can potentially be powered by multiple motors, batteries, generators, and other suitable devices. The ball-screw 42 is mechanically attached to an actuator ring 44. The ball-screw 42 selectively lowers or raises the actuator ring 44 as it turns. The actuator ring 44 is situated along multiple guide rails 46 that extend straight from the first stationary ring 38 to the second stationary ring 40 and restrict the movement of the actuator ring 44 as it is lowered and raised by the ball screw 42. Multiple mechanical arms 48 are coupled to the bottom of the actuator ring 44. The mechanical arms 48 include a first strut 50, a straight bar 52, and a second strut 54. It should be noted that the number of mechanical arms 48 match the number of fairing faces 32 included in the fairing assembly 28. The mechanical arms 48 are actuated simultaneously in the manner detailed below: The top of the first strut 50 is coupled to the actuator ring 44 by a hinged joint that allows the first strut 50 to selectively rotate. As the actuator ring 44 is lowered or raised by the ball screw 42, the actuator ring 44 will push or pull on the first strut 50. The bottom of the first strut 50 is coupled to the center of the straight bar 52 by a hinged joint. As the first strut 50 is selectively pushed or pulled by the actuator ring 44, the first strut 50 will raise or lower the straight bar 52. The inward-end (pointed towards the center of the slider actuator assembly 34) of the straight bar 50 is coupled to the top-end of the second strut 54. The bottom-ends of the second struts 54 are coupled to the second stationary ring 40 by a hinged joint that allows the second strut 54 to selectively rotate. As the straight bar 52 is raised or lowered by the first strut 50, the second strut 54 will rotate the straight bar 52. The outward-ends of the straight bar 52 are coupled to the fairing faces 32 and allow the slider actuator assembly 34 to move the fairing faces 32 from a disengaged position to an engaged position and vice versa.

FIG. 5A shows the slider actuator assembly 34 in a stowed or disengaged position, wherein the actuator ring 44 is raised to rest proximate to the bottom of the first stationary ring 38 and the mechanical arms 48 are oriented to point in an upward direction. Aircraft 10 keeps the slider actuator assembly 34 in a disengaged position while in helicopter mode or in proprotor forward flight mode.

FIG. 5B shows the slider actuator assembly 34 in an intermediate position, wherein the actuator ring 44 is lowered from its position in FIG. 5A and the mechanical arms 48 are oriented in a relatively more radially outward direction. The actuator assembly 34 enters an intermediate position after aircraft 10 is in airplane forward flight mode.

Finally, FIG. 5C shows the slider actuator assembly 34 in an engaged position, wherein the actuator ring 44 is lowered to its lowest possible position and the mechanical arms 48 are oriented to point in a downward direction. Aircraft 10 keeps the slider actuator assembly 34 in an engaged position while in airplane forward flight mode.

Figure 6:
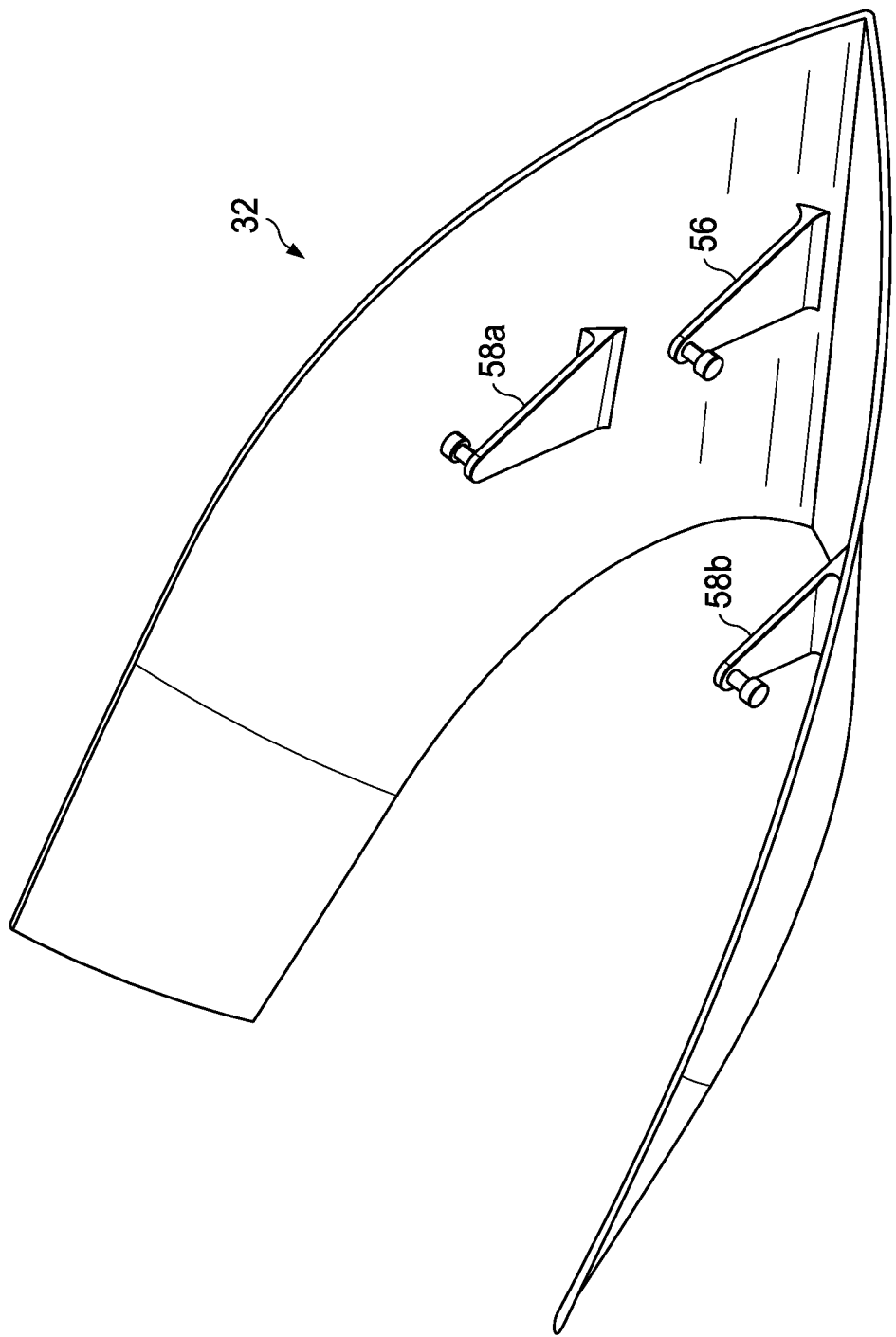
FIG. 6 is an oblique view of a fairing face.

FIG. 6 illustrates an oblique rear view of a fairing face 32. The fairing face 32 includes a central roller protrusion 56 and two side roller protrusions 58a, 58b. The central roller protrusion 56 couples the fairing face 32 to the slider actuator assembly 34.

Figure 7A:
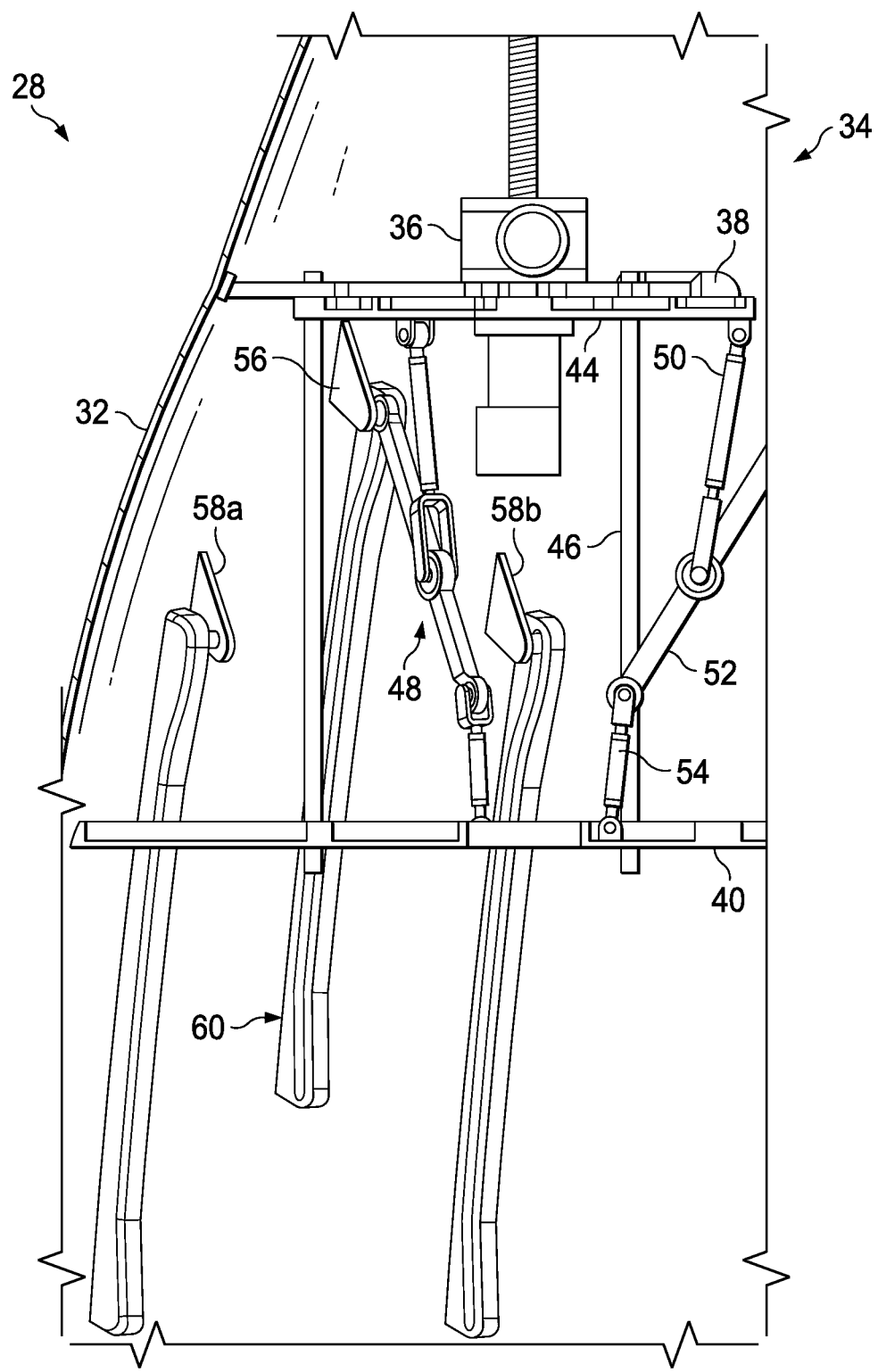
FIG. 7A is a modified schematic illustration of a fairing assembly with a slider actuator assembly.

FIG. 7A is a partial rear view of the fairing assembly's 28 internal structure, with parts of the slider actuator assembly 34 not shown for clarity. The fairing assembly 28 includes three tracks 60, that serve to guide the movement of the fairing face 32. Rollers attached to the central roller protrusion 56 and side roller protrusions 58a, 58b roll along the tracks 60 as the mechanical arm 48 actuates the fairing face 32. It should be noted that the tracks 60 are designed in part to guide the fairing face 32 along a partially curved path.

Figure 7B:
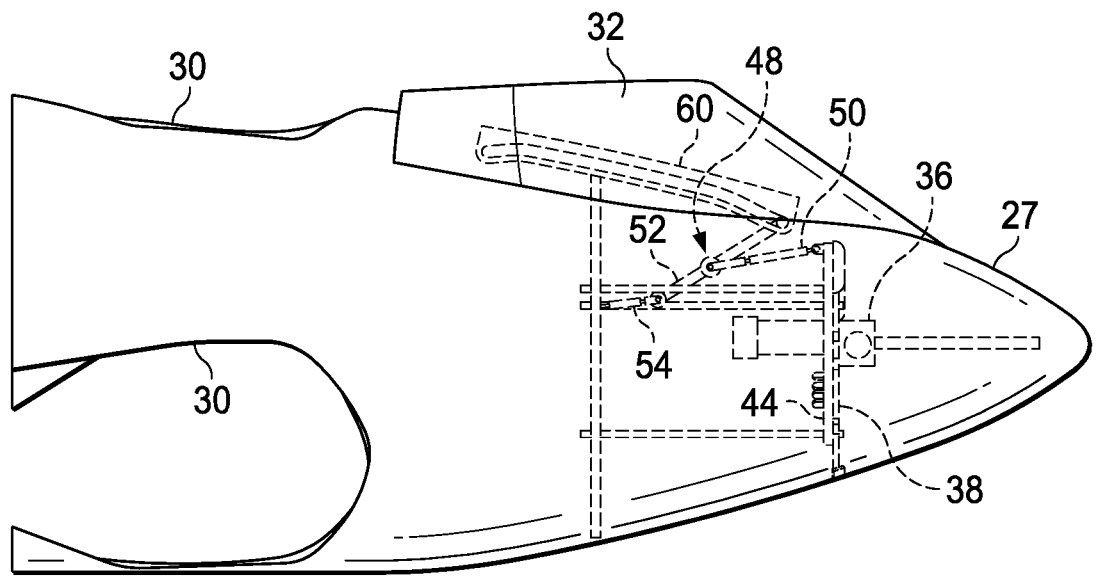
FIGS. 7B-7F are side views of the fairing assembly of FIG. 7A with the fairing face shown at various positions.
Figure 7C:
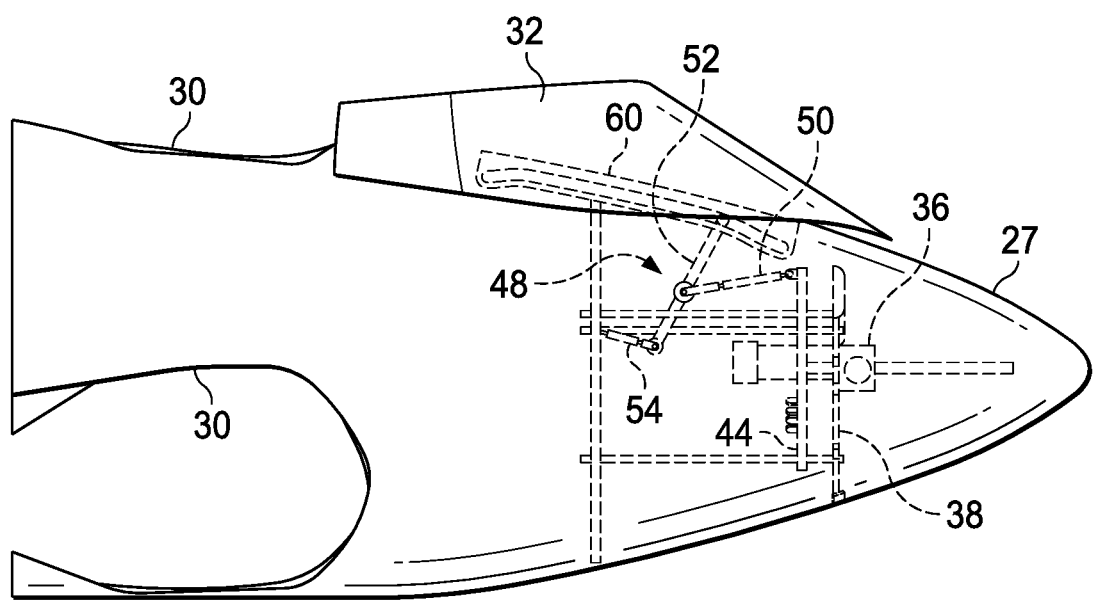
Figure 7D:
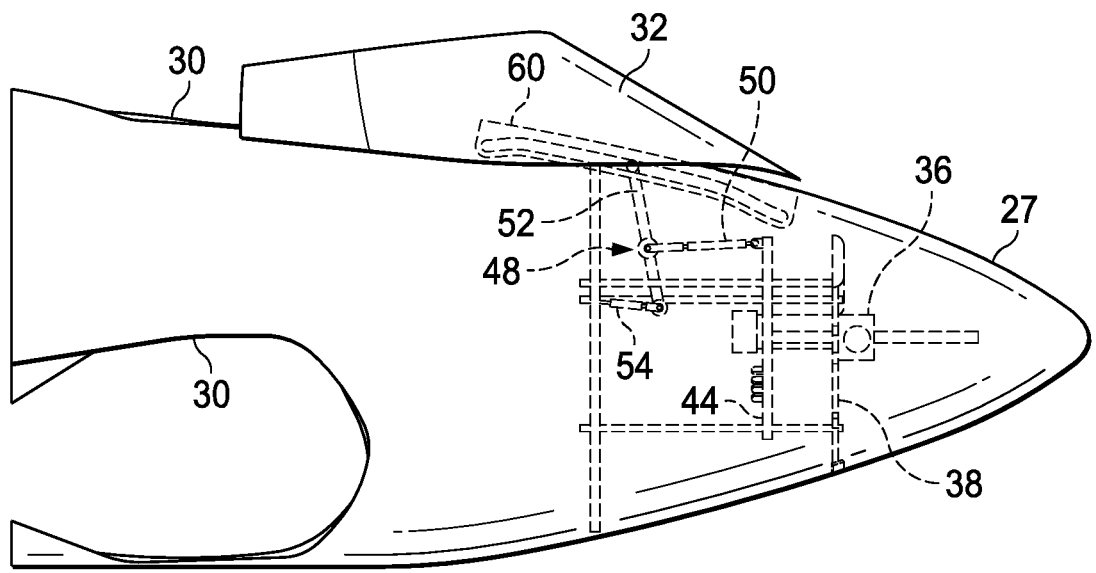
Figure 7E:
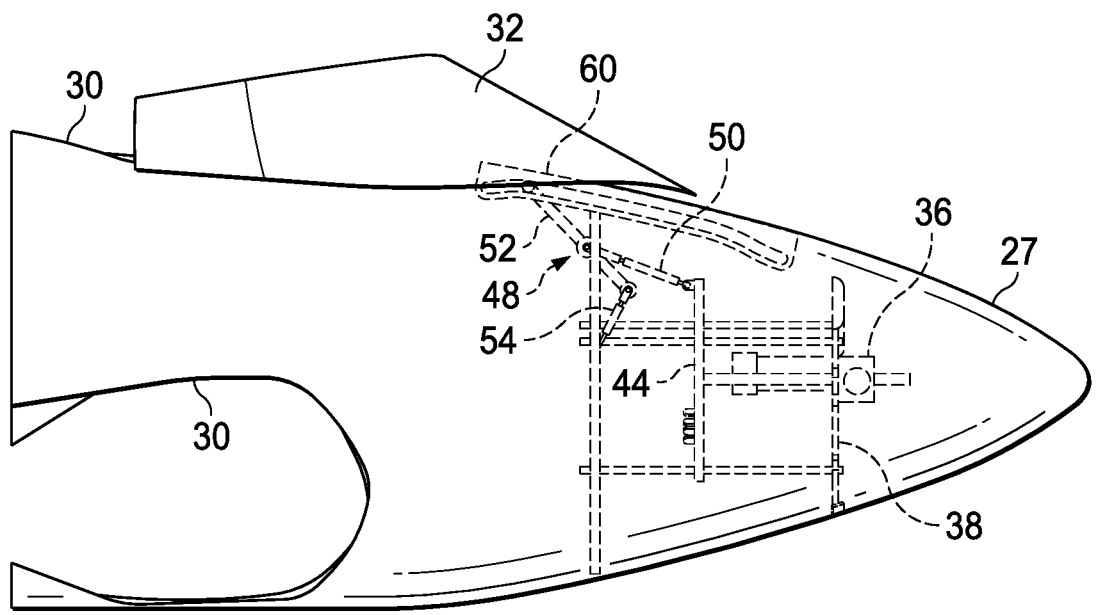
Figure 7F:
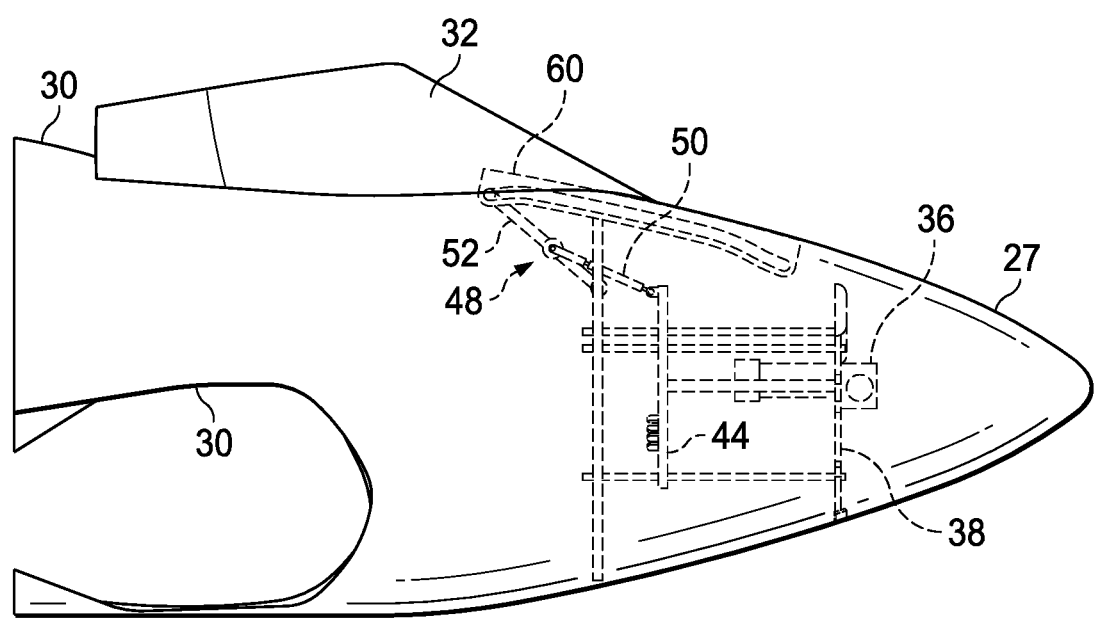

FIGS. 7B-7F are partial side views of the fairing assembly 28 internal structure with parts of the slider actuator assembly 34 not shown for clarity. FIG. 7B shows the fairing face 32 in most forward position associated with a forward end of a slot 61 of track 60. FIG. 7C shows the fairing face 32 in a relatively more rearward position associated with a forward trajectory transition of the slot 61. FIG. 7D shows the fairing face 32 in a relatively more rearward position associated with a central portion of the slot 61. FIG. 7E shows the fairing face 32 in a relatively more rearward position associated with a rearward trajectory transition of the slot 61. FIG. 7F shows the fairing face 32 in a most rearward position associated with a rearward end of the slot 61. As the fairing face 32 is moved along the trajectory of slot 61, the fairing face is generally moved somewhat radially away from the spinner structure 27 while passing through the middle portion of the trajectory and is generally drawn closer to the spinner structure 27 at positions associated with both the forward and rearward ends of the slot 61. In this way, the fairing face 32 can be said to move inward and outward radially relative to the spinner structure 27.

Figure 8A:
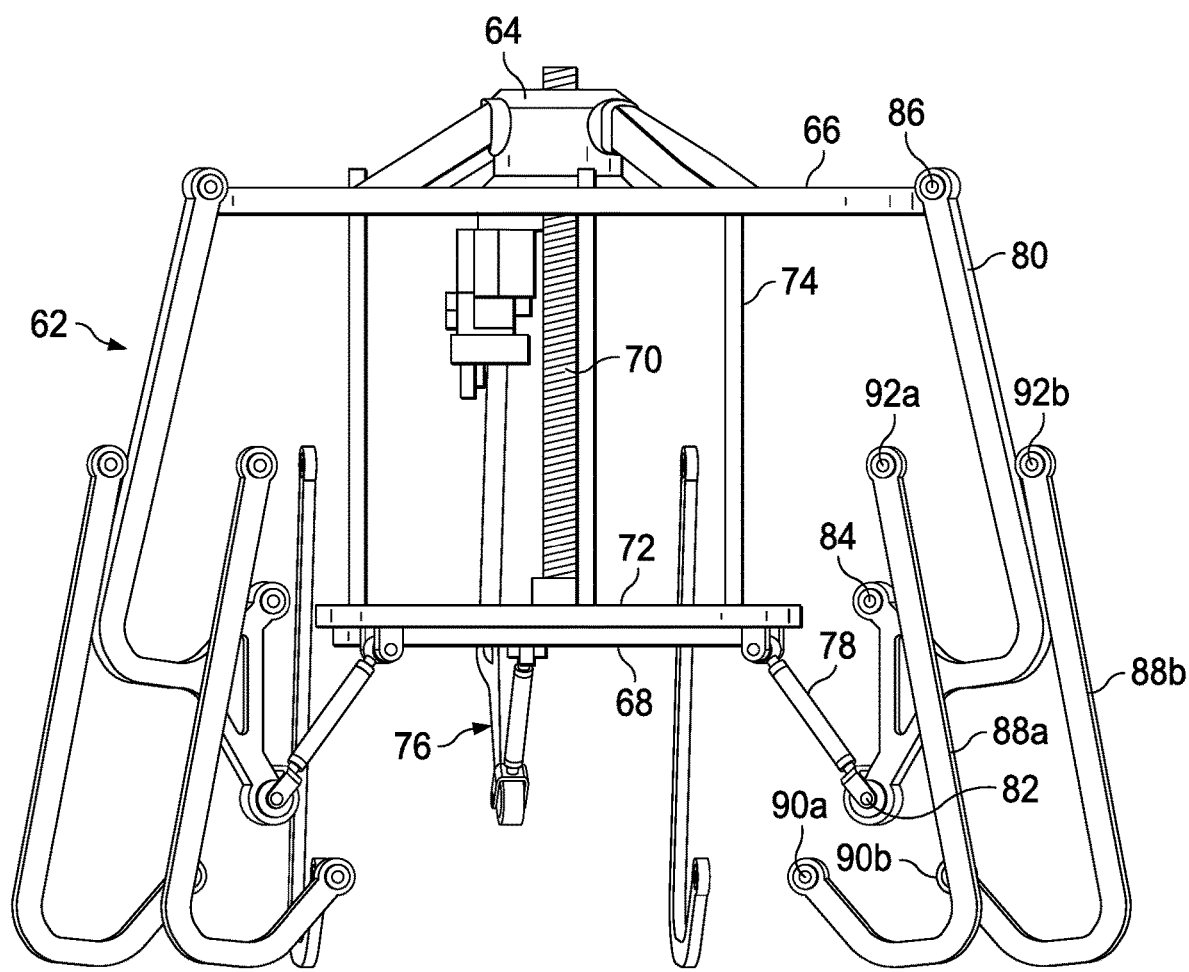
FIGS. 8A-8C are side views of an alternative embodiment 4-bar actuator assembly in various positions.
Figure 8B:
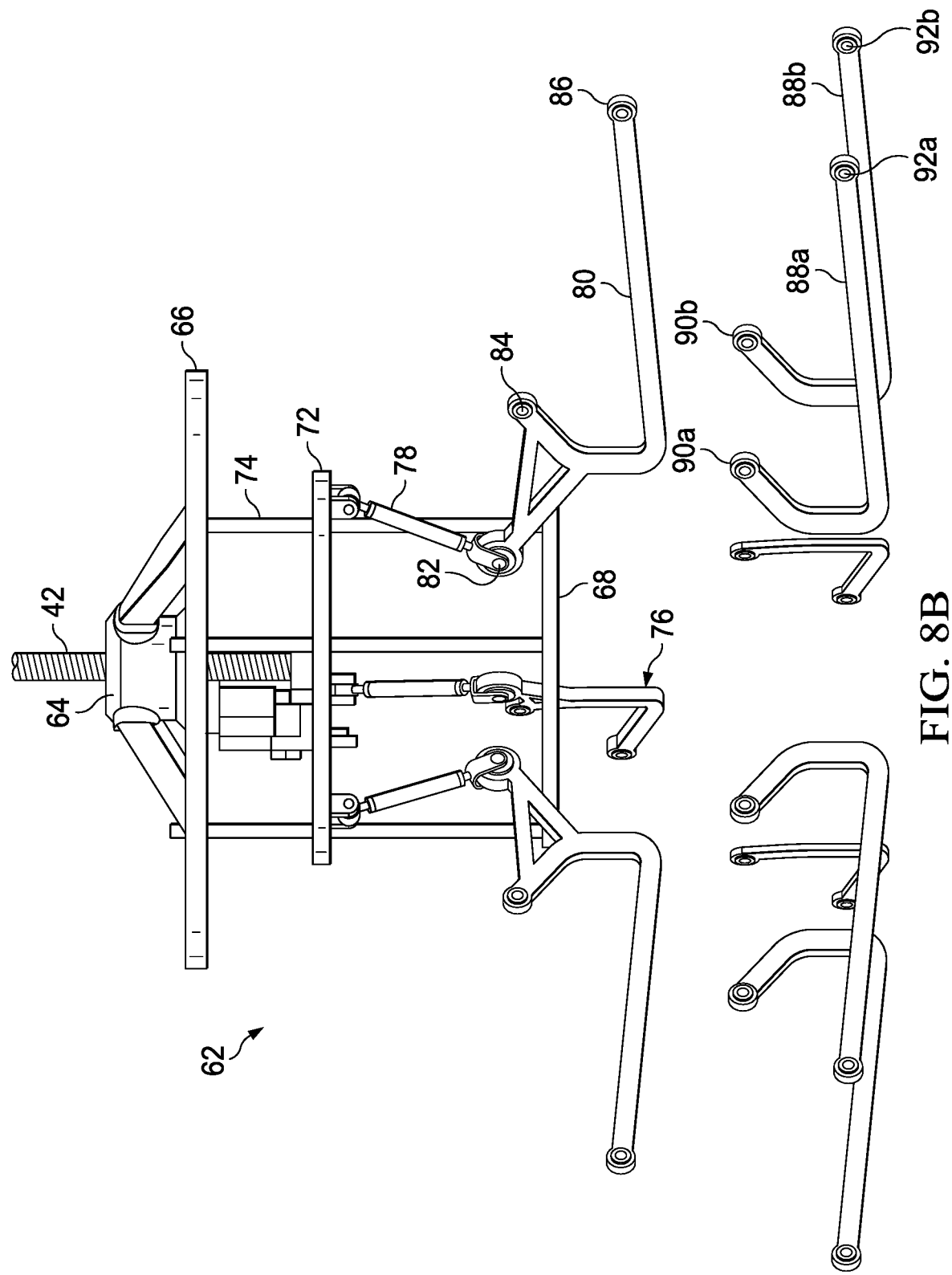
Figure 8C:
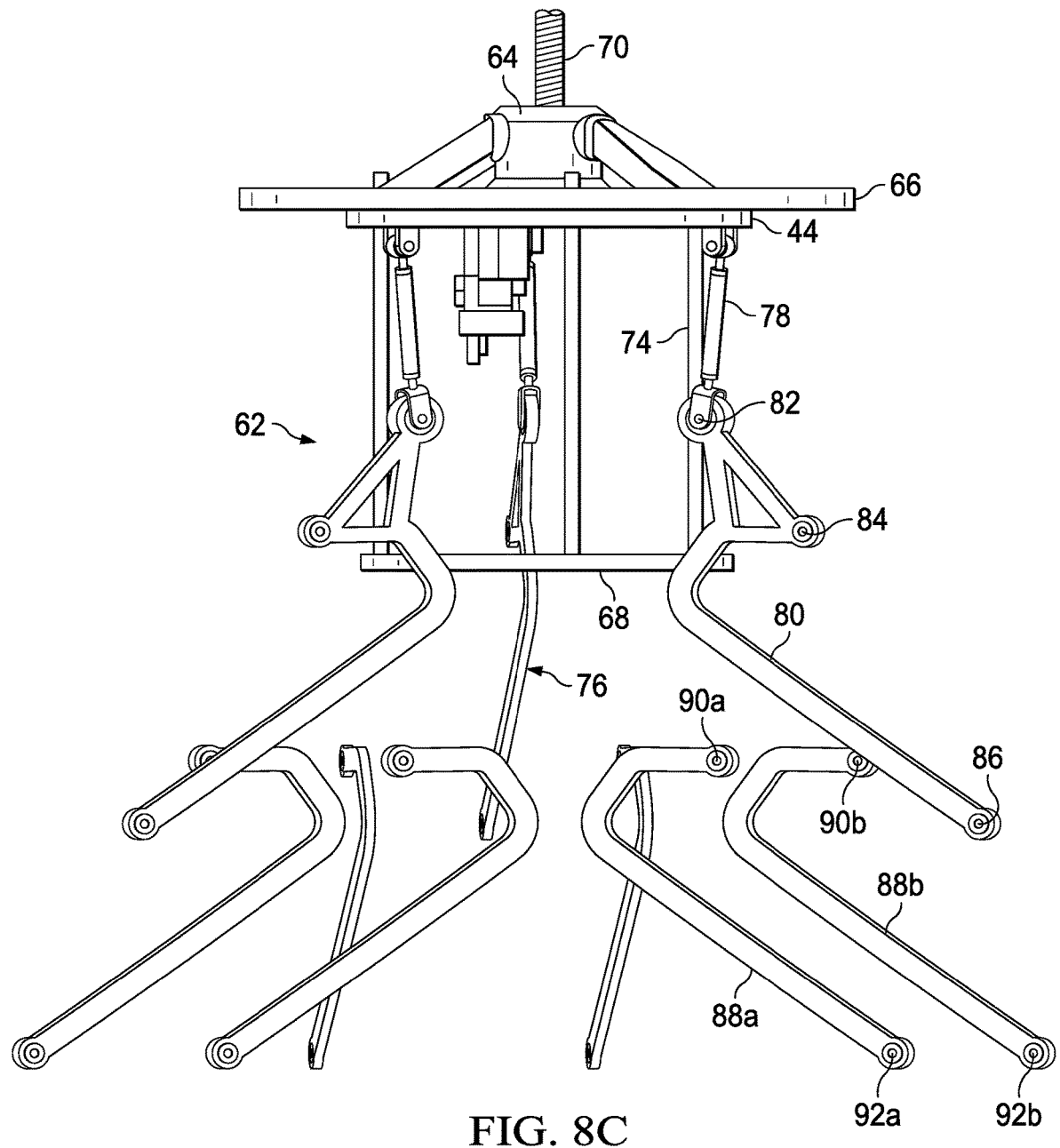

Referring to FIGS. 8A-8C, side views of the 4-bar actuator assembly 62 are shown. The 4-bar actuator assembly 62 can include two stationary rings: a first stationary ring 66 located at the top of the 4-bar actuator assembly 62 and a second stationary ring 68 located at the bottom of the 4-bar actuator assembly 62. The stationary rings 66 and 68 couple the 4-bar actuator assembly 62 to the rotor assembly 20a and hold the 4-bar actuator assembly 62 in place. The 4-bar actuator assembly 62 is powered by a motor 64 or other suitable power source, which turns a ball-screw 70. The ball-screw 70 is mechanically attached to an actuator ring 72. The ball-screw 70 selectively lowers or raises the actuator ring 72 as it turns. The actuator ring 72 is situated along multiple guide rails 74 that run straight from the first stationary ring 66 to the second stationary ring 68 and restrict the movement of the actuator ring 72 as it is lowered and raised by the ball screw 70. Multiple mechanical arms 76 are coupled to the bottom of the actuator ring 72. The mechanical arms 76 include a strut 78 and a modified J-bar 80. The modified J-bar 80 includes three joints: a first joint 82 at the inboard end, a second joint 84 at the inboard end, and a third joint 86 at the outboard end. It should be noted that the number of mechanical arms 76 match the number of fairing faces 32 included in the fairing assembly 28. The mechanical arms 76 are actuated simultaneously in the manner detailed below: The top of the strut 78 is coupled to the actuator ring 72 by a hinged joint that allows the strut 78 to selectively rotate. As the actuator ring 72 is lowered or raised by the ball screw 70, the actuator ring 72 will push or pull on the strut 78. The first joint 82 of the modified J-bar 80 is coupled to the bottom of the strut 78. The second joint 84 is coupled to the internal structure of the rotor assembly 20a and allows the modified J-bar 80 1-degree of freedom to rotate. As the strut 78 is selectively pushed or pulled by the actuator ring 72, the strut 78 will rotate the modified J-bar 80, about the second joint's 84 axis. The third joint 86 of the modified J-bar 80 is coupled to the fairing faces 32 with a fixed joint and allows the 4-bar actuator assembly 62 to move the fairing faces 32 from a disengaged position to an engaged position and vice versa. The mechanical arm 76 is assisted in moving the fairing faces 32 by two J-bars 88a, 88b positioned further below and to the left and right side of the mechanical arm 76, respectively. It should be noted that each mechanical arm 76 is assisted by two J-bars 88a, 88b and that the J-bars 88a, 88b move simultaneously with each mechanical arm 76. The J-bars 88a, 88b comprise inboard joints 90a, 90b and outboard joints 92a, 92b. The inboard joints 90a, 90b couple the J-bars 88a, 88b to the internal structure of the rotor assembly 20a, 20b and allow the J-bars 1-degree of freedom to rotate about the inboard joints' 90a, 90b axes. The outboard joints 92a, 92b are coupled to fairing faces 32 by a fixed joint.

FIG. 8A shows the 4-bar actuator assembly 62 in a stowed or disengaged position, wherein the actuator ring 72 is lowered proximate to the top of the second stationary ring 68 and the mechanical arms 76 are oriented to point in an upward direction. Aircraft 10 keeps the 4-bar actuator assembly 62 in a disengaged position while in helicopter mode or in proprotor forward flight mode.

FIG. 8B shows the 4-bar actuator assembly 62 in an intermediate position, wherein the actuator ring 72 is further raised from its position in FIG. 8A and the mechanical arms 76 and the J-bars 88a, 88b have been oriented to point in a radially outward direction. The 4-bar actuator assembly 62 enters an intermediate position after aircraft 10 is in airplane forward flight mode.

Finally, FIG. 8C shows the 4-bar actuator assembly 62 in an engaged position, wherein the actuator ring 72 is raised to its highest possible position proximate to the bottom of first stationary ring 66 and the mechanical arms 76 and J-bars 88a, 88b have been oriented to point in a downward direction. Aircraft 10 keeps the 4-bar actuator assembly 62 in an engaged position while in airplane forward flight mode. It should be noted that the 4-bar actuator assembly 62 is designed in part to guide the fairing faces 32 along a partially curved path.

Figure 9:
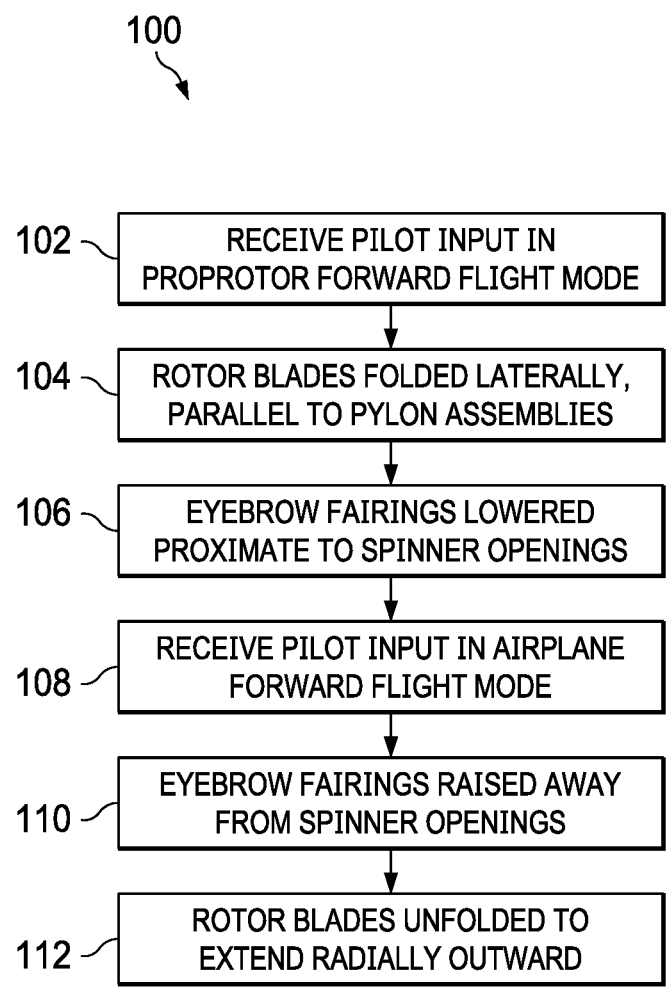
FIG. 9 is a flowchart of a method 100 of controlling a fairing assembly.

Referring to FIG. 9, the cockpit 13, in addition to housing a pilot, contains pilot instrumentation that is in mechanical or electronic communication with the rotor assemblies 20a and 20b and is capable of receiving a pilot input. FIG. 9 is a flowchart of a method 100 of controlling a fairing assembly 28 using one or more pilot inputs. In step 102 of the method 100, a pilot input is received mid-flight, while the aircraft 10 is in proprotor forward flight mode. In step 104, the pilot input prompts the rotor blades 22 of both rotor assemblies 20a and 20b to fold laterally, parallel to the pylon assemblies 18a and 18b. In step 106, the motive fairings 28 of both rotor assemblies 20a and 20b are automatically lowered into an engaged position proximate to the spinner openings 30, without further pilot input. In step 108, a pilot input is received mid-flight, while the aircraft 10 is in airplane forward flight mode. In step 110, the pilot input prompts the motive fairings 28 of both rotor assemblies 20a and 20b to further raise themselves above the spinner openings 30 and out of the path of the rotor blades 22. In step 112, the rotor blades 22 are automatically unfolded to extend radially outward, without further pilot input.

What is claimed is:

1. A rotor assembly with a longitudinal length for use in a stop-fold aircraft comprising:
    a rotor hub;
    a spinner structure comprising a spinner opening;
    a rotor blade received through the spinner opening, the rotor blade comprising a rotor root located proximate to the rotor hub, the rotor blade being movable between an extended position and a folded position; and
    a fairing face that moves along and is disposed outside the rotor hub;
    wherein moving the rotor blade from the extended position to the folded position does not increase a longitudinal overlap between the rotor blade and the spinner structure.

2. The rotor assembly according to claim 1, wherein the fairing face is situated above the rotor blade and the spinner opening.

3. The rotor assembly according to claim 2, wherein the fairing face has aerodynamically tailored geometry.

4. The rotor assembly according to claim 3, wherein the fairing face further comprises a base with a u-shaped bottom that is designed to partially encompass the blade root.

5. The rotor assembly according to claim 4, wherein an actuator assembly is used to selectively move the fairing face.

6. The rotor assembly according to claim 5, wherein the fairing face is configured to move along the longitudinal length of the rotor assembly.

7. The rotor assembly according to claim 6, wherein the fairing face is configured to move along a curved path.

8. The rotor assembly according to claim 7, wherein the actuator assembly further comprises an actuator ring and a ball screw to selectively move the fairing face.

9. The rotor assembly according to claim 8, wherein the fairing face comprises:
    a roller protrusion; and
    a roller attached to the roller protrusion; and
    wherein the actuator assembly comprises:
    a power source in mechanical communication with the ball screw;
    a mechanical arm to couple the power source to the fairing face; and
    a slider track placed along the longitudinal length of the rotor assembly along which the roller rolls.

10. The rotor assembly according to claim 9, wherein the rotor assembly further comprises:
    a plurality of rotor blades;
    a plurality of spinner openings; and
    a plurality of fairing faces; and
    wherein the actuator assembly is configured to simultaneously move the plurality of fairing faces.

11. The rotor assembly according to claim 8, wherein the actuator assembly comprises:
    a power source in mechanical communication with the actuator ring and the ball screw; and
    a four-bar linkage to couple the power source to the fairing face.

12. The rotor assembly according to claim 11, wherein the rotor assembly further comprises:
    a plurality of rotor blades;
    a plurality of spinner openings; and
    a plurality of fairing faces; and
    wherein the actuator assembly is configured to simultaneously move the plurality of fairing faces.

13. The rotor assembly according to claim 7, wherein the rotor assembly has a non-folded mode, wherein the rotor blade extends radially outward and can selectively flap and feather, and a folded mode, wherein the rotor blade is folded along the longitudinal length of the rotor assembly and are locked, thereby preventing flapping motion and feathering motion.

14. The rotor assembly according to claim 13, wherein the fairing face is lowered proximate to the spinner opening in the folded mode.

15. A method of using a stop-fold aircraft pilot input system in mechanical and electronic communication with a rotor assembly comprising a spinner structure having a spinner opening, a rotor blade, a rotor hub and a fairing face that moves along and is disposed outside the rotor hub, wherein the fairing face is situated upstream relative to both the spinner opening and the rotor blade to move along the longitudinal length of the rotor assembly, wherein the rotor blade is movable between an extended position and a folded position and wherein moving the rotor blade from the extended position to the folded position does not increase a longitudinal overlap between the rotor blade and the spinner structure.

16. The method of claim 15, wherein in response to a pilot input into the pilot input system the rotor blade is first folded laterally along the length of the rotor assembly and the fairing face is secondly moved closer to the spinner opening.

17. The method of claim 16, wherein in response to a pilot input into the pilot input system the fairing face is first moved away from the spinner opening and the rotor blade is secondly unfolded to extend radially outward.

18. A stop-fold aircraft comprising:
a body;
a wing coupled to the body;
a power train coupled to at least one of the body or the wing and comprising a power source and a pylon assembly in mechanical communication with the power source;
a rotor assembly pivotally coupled to the wing in mechanical communication with the pylon assembly, the rotor assembly comprising:
a rotor hub in mechanical communication with the pylon assembly;
a spinner structure comprising a spinner opening;
a rotor blade received through the spinner opening in mechanical communication with the rotor hub and foldable laterally along the length of the pylon assembly, the rotor blade being movable between an extended position and a folded position; and
a fairing face that moves along and is disposed outside the rotor hub;
a fairing face that moves along and is disposed outside the rotor hub, the fairing face being situated upstream of the spinner opening and rotor blade, the fairing face being configured to move longitudinally along the length of the rotor assembly; and
an actuator assembly for selectively moving the fairing face;
wherein moving the rotor blade from the extended position to the folded position does not increase a longitudinal overlap between the rotor blade and the spinner structure.

19. The stop-fold aircraft according to claim 18, wherein the rotor assembly further comprises:
a plurality of rotor blades;
a plurality of spinner openings; and
a plurality of fairing faces; and
wherein the actuator assembly is configured to simultaneously move the plurality of fairing faces.

20. The stop-fold aircraft according to claim 19, further comprising:
a cockpit; and
a pilot input system in mechanical or electronic communication with the plurality of rotor blades and the plurality of fairing faces.

* * * * *